US012721256B2

(12) United States Patent
Morii et al.

(10) Patent No.: US 12,721,256 B2
(45) Date of Patent: Sep. 1, 2026

(54) LAWN MOWER

(71) Applicant: HONDA MOTOR CO., LTD., Tokyo (JP)

(72) Inventors: Misago Morii, Wako (JP); Fumio Minami, Wako (JP); Keisuke Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 18/620,158

(22) Filed: Mar. 28, 2024

(65) Prior Publication Data

US 2025/0301946 A1 Oct. 2, 2025

(51) Int. Cl.

| | |
|---|---|
| ***A01D 34/00*** | (2006.01) |
| ***A01D 34/68*** | (2006.01) |
| ***A01D 34/81*** | (2006.01) |
| ***A01D 34/82*** | (2006.01) |

(52) U.S. Cl.

CPC ........... *A01D 34/006* (2013.01); *A01D 34/81* (2013.01); *A01D 34/82* (2013.01)

(58) Field of Classification Search

CPC ...... A01D 34/006; A01D 34/81; A01D 34/82; A01D 34/005; A01D 34/64; A01D 34/001; A01D 34/6806; A01D 42/005; A01D 43/063; A01D 43/0631

See application file for complete search history.

(56) References Cited

U.S. PATENT DOCUMENTS

| | | | | |
|---|---|---|---|---|
| 10,070,578 | B2 * | 9/2018 | Kuriyagawa ...... | A01D 34/6806 |
| 2018/0177128 | A1 * | 6/2018 | Kuriyagawa ........ | A01D 42/005 |
| 2019/0307071 | A1 | 10/2019 | Kuriyagawa et al. | |
| 2019/0313576 | A1 | 10/2019 | Haneda et al. | |
| 2019/0380271 | A1 | 12/2019 | Kuriyagawa et al. | |

FOREIGN PATENT DOCUMENTS

| | | |
|---|---|---|
| JP | 2018-102196 A | 7/2018 |
| JP | 2018-102197 A | 7/2018 |
| JP | 2018-102198 A | 7/2018 |
| JP | 2018-109848 A | 7/2018 |

* cited by examiner

*Primary Examiner* — Matthew Troutman
*Assistant Examiner* — Robert E Pezzuto
(74) *Attorney, Agent, or Firm* — Rankin, Hill & Clark LLP

(57) ABSTRACT

An aspect of a lawn mower according to the present disclosure is equipped with an accommodation container disposed in a front housing, a first passage that places the front housing and the accommodation container in communication, and a flow path adjustment unit disposed between an operation unit and the accommodation container, and at a position where transporting air that flows through the first passage can be adjusted. A control unit, in accordance with a predetermined condition in relation to a load of the operation unit, controls a degree of opening of the flow path adjustment unit.

16 Claims, 16 Drawing Sheets

10
Y1
Y
Y2
Z1
Z
Z2
12
12a
12b
121
122
14
16(161)
16(162)
18(181)
181s
20
22
221
24
26
28
30
32
34
36
38
40
40r
40s
40u
42
42b
42f
42s
42u
46
50
52
54
56
60
62
64
66
68
70
72
74
76
80(40f)
82
A12(Ay)

10
Y1
Y
Y2
Z1
Z
Z2
14s1
36
60
62
40r
32
34
64
44
A1
20
38
221
24
22
26
18(181)
40u
12
50
54
52
56
70
74
72
76
A2
A3
28
42u
44a
42b
30
42
14s
42f
14

10
Y1
Y
Y2
Z1
Z
Z2
12
12a
12b
121
122
16(161)
16(162)
18(181)
181s
20
22
221
24
26
28
30
32
34
38
40
40r
40s
40u
42
42b
42f
42s
42u
44c
46
50
52
54
56
60
62
64
66
68
70
72
74
76
80(40f)
82
A1
A2
A4
A12(Ay)

10
Y1
Y
Y2
Z1
Z
Z2
32
34
16(162)
60
40r
62
64
66
12b
12a
12a
122
121
46
20
20
221
22
38
181s
A12(Ay)
18(181)
40
26
40u
44c
50
12
40s
52
54
56
A2
68
16(161)
72
74
70
80(40f)
76
28
42u
82
42b
42s
30
42
42f

20
BATTERY
24
CONTROL UNIT
22 (90)
221
ELECTRICAL CURRENT SENSOR
222
STEERING ANGLE SENSOR
223
YAW RATE SENSOR
224
ACCELERATION SENSOR
225
WHEEL SPEED SENSOR
226
GNSS SENSOR
30 (90)
301
Camera
302
LiDAR
34 (90)
341
SETTING INPUT UNIT
88
ELECTRICAL POWER SOURCE SWITCH
89
OPERATION SWITCH
TRAVELING MOTOR
182L
TRAVELING MOTOR
182R
WORKING MOTOR
181
FIRST SHUTTER ACTUATOR
76
SECOND SHUTTER ACTUATOR
56
COVER MEMBER ACTUATOR
64

Figure 10:
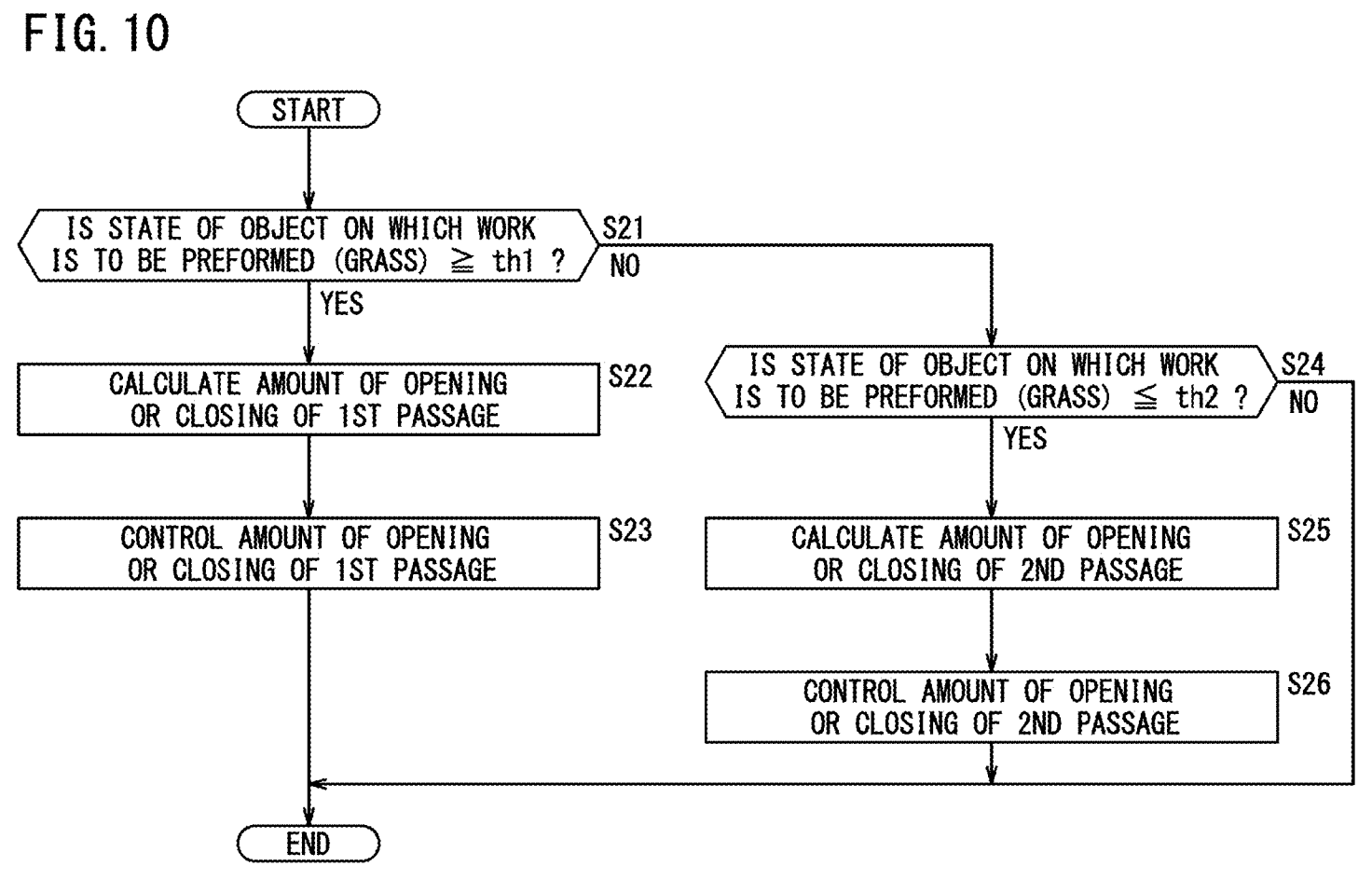

START

S21 IS STATE OF OBJECT ON WHICH WORK IS TO BE PREFORMED (GRASS) ≧ th1 ?

YES

S22 CALCULATE AMOUNT OF OPENING OR CLOSING OF 1ST PASSAGE

S23 CONTROL AMOUNT OF OPENING OR CLOSING OF 1ST PASSAGE

NO

S24 IS STATE OF OBJECT ON WHICH WORK IS TO BE PREFORMED (GRASS) ≦ th2 ?

YES

S25 CALCULATE AMOUNT OF OPENING OR CLOSING OF 2ND PASSAGE

S26 CONTROL AMOUNT OF OPENING OR CLOSING OF 2ND PASSAGE

NO

END

Figure 12:
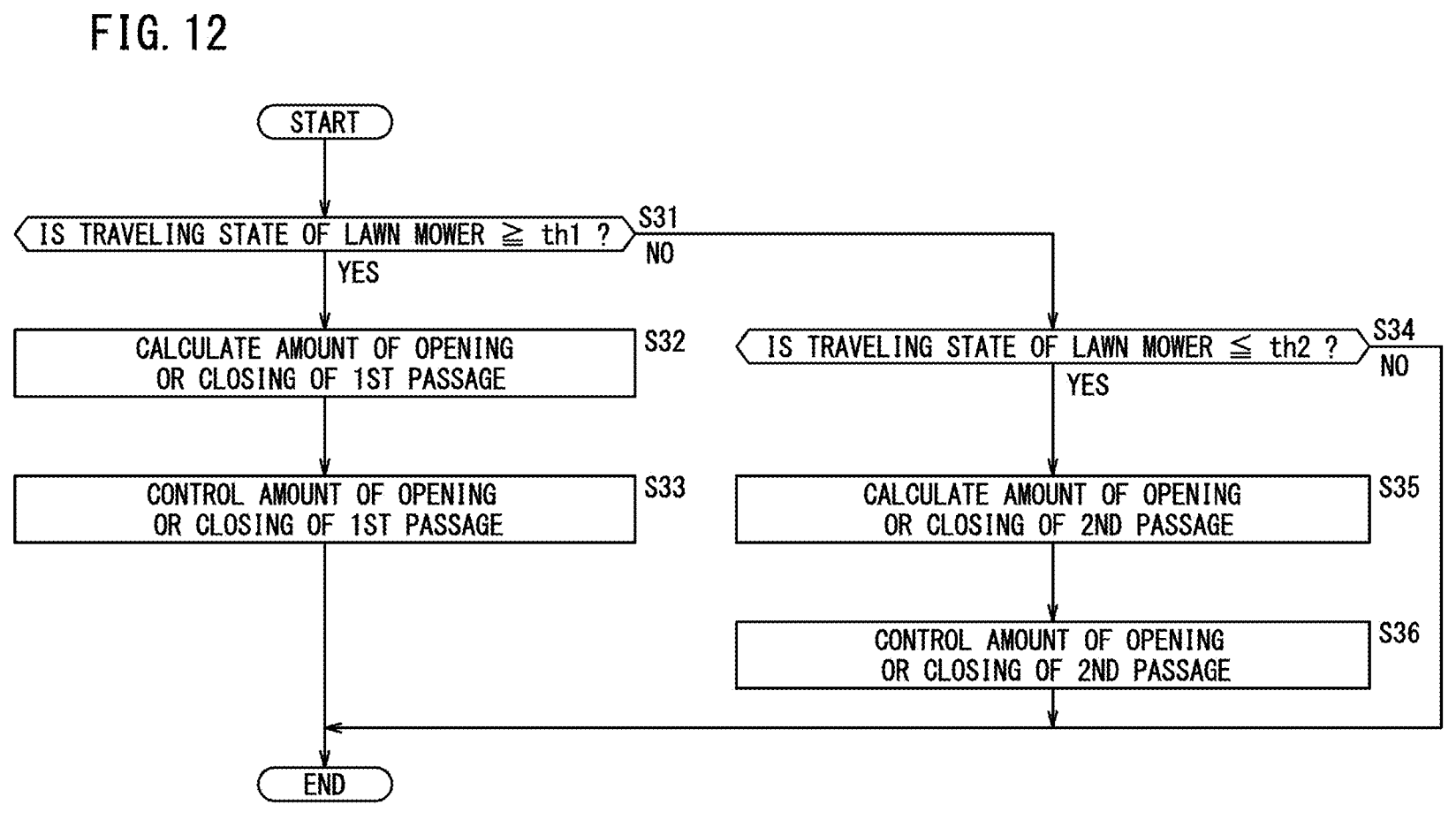

START

S31 IS TRAVELING STATE OF LAWN MOWER ≧ th1 ?

YES

NO

S32 CALCULATE AMOUNT OF OPENING OR CLOSING OF 1ST PASSAGE

S33 CONTROL AMOUNT OF OPENING OR CLOSING OF 1ST PASSAGE

S34 IS TRAVELING STATE OF LAWN MOWER ≦ th2 ?

YES

NO

S35 CALCULATE AMOUNT OF OPENING OR CLOSING OF 2ND PASSAGE

S36 CONTROL AMOUNT OF OPENING OR CLOSING OF 2ND PASSAGE

END

FIG. 14B bagging mode

324

322

320 bagging mode

410
private property 414
backyard 426
(bagging area)
backyard 424
(return area)
house 416
garage 418
driveway 420
garden 422
(mulching area)
road 412
400

LAWN MOWER

BACKGROUND OF THE INVENTION

Field of the Invention

The present invention relates to a lawn mower.

Description of the Related Art

In recent years, efforts directed toward realizing a low-carbon or decarbonized society have become more active, and research and development in relation to electrification technology are also being conducted in order to reduce $CO_2$ emissions and to improve energy efficiency.

In JP 2018-102197 A, a lawn mower is disclosed, which is capable of switching, based on the velocity of traveling, between a mulching mode in which grass clippings are discharged downwardly of a housing, and a bagging mode in which the grass clippings are accommodated in an accommodation container attached to a rear part of the housing.

SUMMARY OF THE INVENTION

Even in the case that a workload of the lawn surface is high, it is preferable for the grass clippings to be sufficiently shredded, so that it is unlikely that clumps of the grass clippings and large pieces of the grass clippings will fall onto the lawn surface. There is a strong demand for a lawn mower that provides a good finish after a lawn mowing operation.

The present invention has the object of solving the aforementioned problem.

A first aspect of the present invention is characterized by a lawn mower, including an operation unit configured to cut a work object by rotating, and configured to generate transporting air, a drive source configured to drive the operation unit, a control unit configured to control the drive source, a housing including a blade housing in which the operation unit is accommodated, and a front housing configured to project out in a frontward direction from the blade housing, and to communicate with the blade housing, an accommodation container provided for the front housing, a first passage configured to place the front housing and the accommodation container in communication, and a flow path adjustment unit disposed between the operation unit and the accommodation container, and provided at a position where the transporting air that flows through the first passage is adjustable, wherein the control unit includes at least one processor configured to execute a computer-executable instruction that is stored in a memory, and by the computer-executable instruction being executed by the at least one processor, in accordance with a predetermined condition in relation to a load of the operation unit, controls a degree of opening of the flow path adjustment unit.

According to the present invention, there is provided a lawn mower that provides a good finish after the lawn mowing operation.

The above and other objects, features, and advantages of the present invention will be easily understood from the following description of respective embodiments when taken in conjunction with the accompanying drawings.

BRIEF DESCRIPTION OF THE DRAWINGS

FIG. 10 is a flowchart showing a process flow of a passage opening or closing amount control which is executed by the lawn mower according to a second embodiment;

Figure 11:
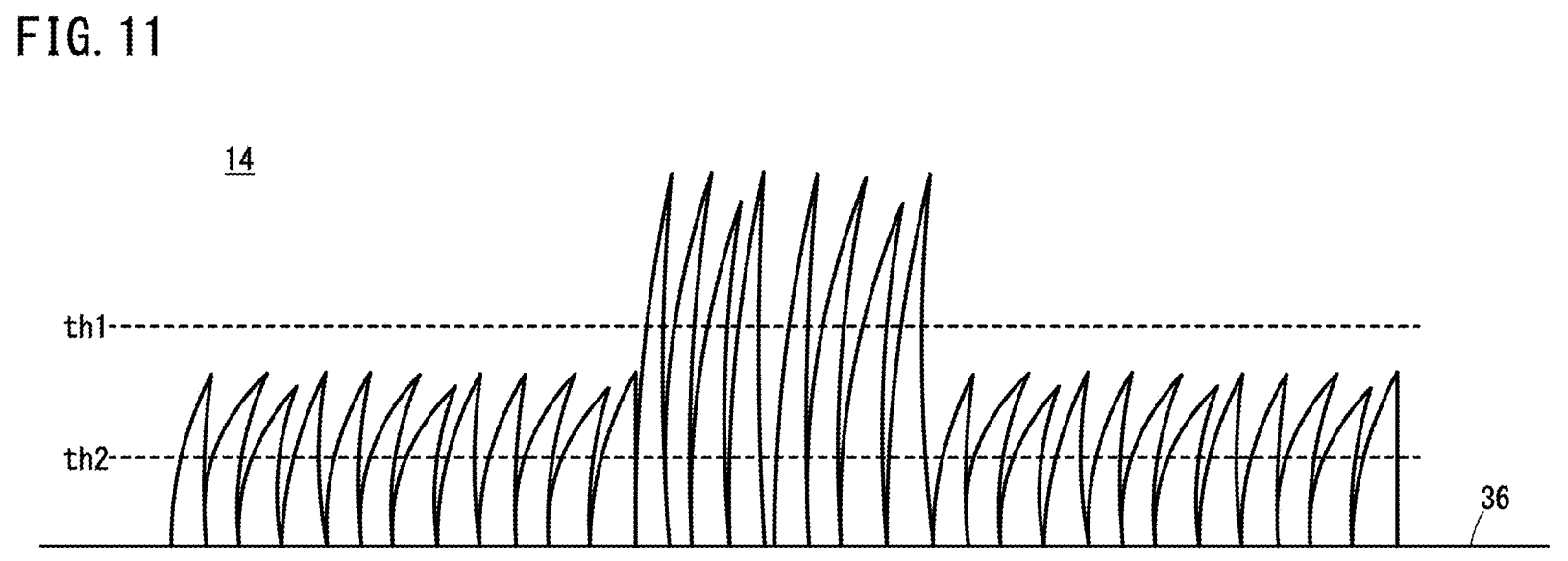

FIG. 11 is a schematic diagram showing an example of image data of the grass;

FIG. 12 is a flowchart showing a process flow of a passage opening or closing amount control which is executed by the lawn mower according to a third embodiment;

FIG. 14A is a schematic diagram showing an example of a pathway along which the lawn mower travels autonomously; and FIG. 14B is a schematic diagram showing an example of a pathway along which the lawn mower travels autonomously;

FIG. 15 is a flowchart showing a process flow of a passage opening or closing amount control which is executed by the lawn mower according to a fourth embodiment.

DESCRIPTION OF PREFERRED EMBODIMENTS

First Embodiment

Figure 1:
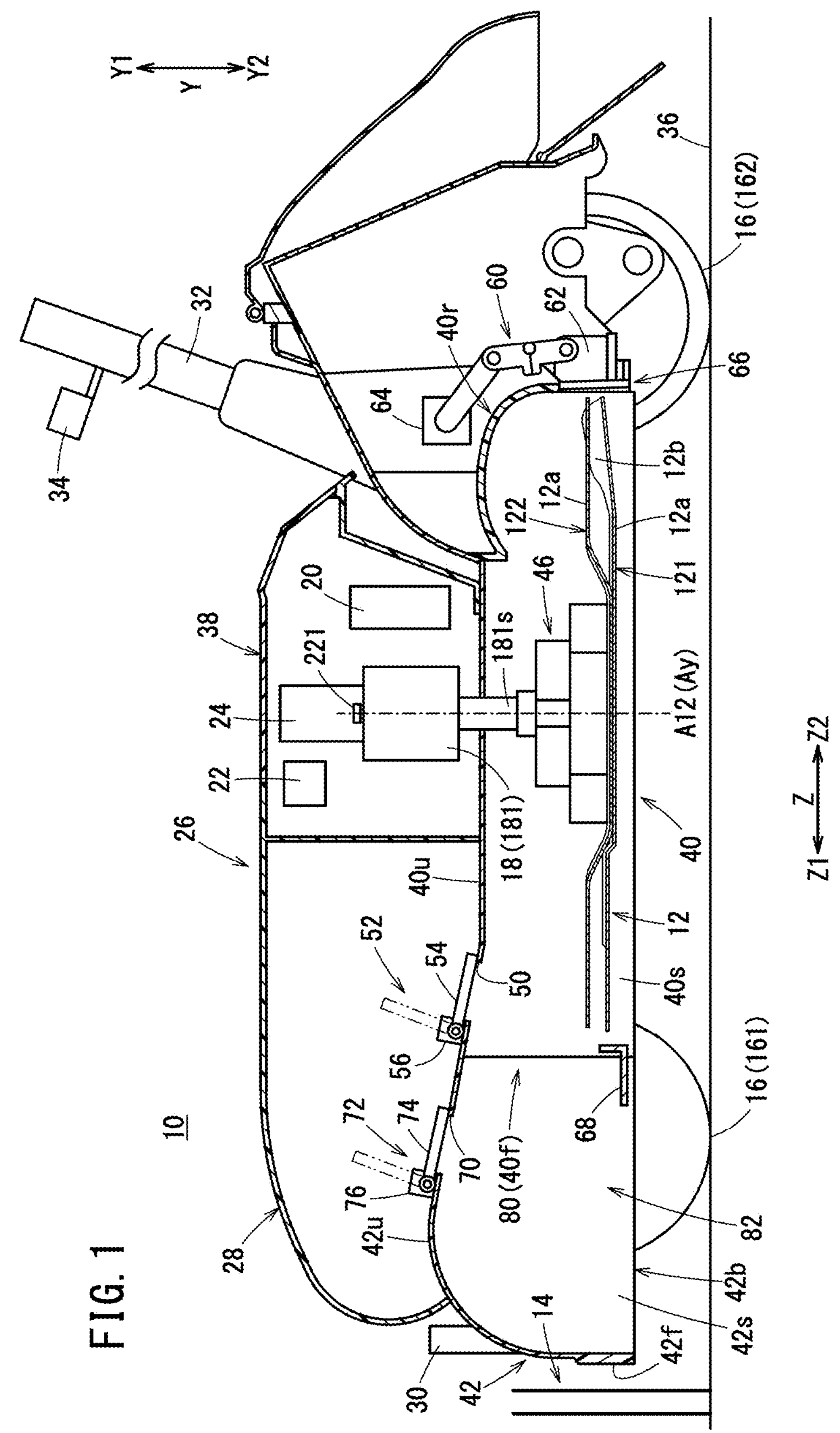
FIG. 1 is a schematic side cross-sectional view of a lawn mower according to a first embodiment.

FIG. 1 is a schematic side cross-sectional view of a lawn mower 10 according to a first embodiment.

The lawn mower 10 is a machine that cuts grass 14 using a cutter blade 12. In this instance, a case will be described in which the lawn mower 10 is a walking type of lawn mower, however, the present invention is not limited to this feature. For example, the lawn mower 10 may be a riding type of lawn mower equipped with a steering wheel, or a robotic type of autonomous working machine. Further, in this instance, although the lawn mower 10 is described herein in which a work object is grass 14, the lawn mower 10 is capable of operating overall with any type of low-growing vegetation, such as a lawn, grass, weeds, or the like serving as the work object.

As shown in FIG. 1, the lawn mower 10 is equipped with a cutter blade (an operation unit) 12, a plurality of wheels 16, a drive source 18, a battery 20, a sensor unit 22, a control unit 24, a housing 26, an accommodation container 28, an external environment recognition unit 30, and an operating handle 32.

The cutter blade 12, the drive source 18, the battery 20, the sensor unit 22, and the control unit 24 are accommodated in the housing 26. The accommodation container 28 is a container in which any type of low-growing vegetation, such as lawn vegetation, grass, weeds, or the like serving as the work object is accommodated, and is attached in an attachable and removable manner to a front upper surface of the housing 26. The accommodation container 28 may be, for example, a grass bag. The external environment recognition unit 30 is disposed on the front upper surface of the housing 26. The operating handle 32 extends obliquely upward from the rearward side of the housing 26. A display device 34 is attached to an upper end part of the operating handle 32.

The plurality of wheels 16, for example, include two front wheels 161 and two rear wheels 162. By the four wheels 16 rotating, the lawn mower 10 is capable of traveling on a ground surface 36. Moreover, it should be noted that the number of wheels 16 provided on the lawn mower 10 is not necessarily limited to being four.

The drive source 18 includes a working motor 181. The working motor 181 causes the cutter blade 12 to be rotatably driven. The working motor 181 includes a shaft 181*s*. The shaft 181*s* extends in a downward direction Y2. The shaft 181*s* is rotatably driven using the battery 20.

The drive source 18 may further include non-illustrated traveling motors 182. According to the present embodiment, the traveling motors 182 can be provided at a suitable location inside the housing 26. The traveling motors 182L and 182R may include a traveling motor 182L (not shown) that drives the left rear wheel 162, and a traveling motor 182R (not shown) that drives the right rear wheel 162. Shafts 182*s* of the traveling motors 182 are driven using the battery 20. Further, the drive source 18 includes a cover member actuator 64, a shutter actuator 76, and a shutter actuator 56, which will be described later.

The control unit 24 is a computer that controls the lawn mower 10. The control unit 24, for example, is equipped with at least one processor and a memory. The memory stores (has recorded therein) a computer executable program. The processor, by executing the program that is stored in the memory, controls the lawn mower 10. For example, based on the program, the processor controls the drive source 18. Consequently, the control unit 24 is capable of driving the cutter blade 12, the plurality of wheels 16, the cover member actuator 64, the shutter actuator 76, and the shutter actuator 56, which will be described later. At least a portion of the control unit 24 may be constituted by means of an integrated circuit, a discrete device, or the like.

The cutter blade 12 has a plurality of blades that rotate in accordance with the driving of the working motor 181. Specifically, as shown in FIG. 1, the cutter blade 12 is equipped with a first blade 121 and a second blade 122. The material of the first blade 121 and the second blade 122 may be, for example, a metal (an alloy). Both the first blade 121 and the second blade 122 extend in a direction perpendicular to the shaft 181*s*.

The lawn mower 10 causes the cutter blade 12 to be rotated while traveling in the frontward direction Z1. In accordance with this feature, the lawn mower 10 cuts the grass 14 that grows on the ground surface 36. More specifically, the lawn mower 10 according to the first embodiment is a so-called rotary lawn mower.

An axis of rotation A12 of the cutter blade 12 extends in an upper-lower direction Y of the lawn mower 10. The upper-lower direction Y (Y1, Y2) is a direction that intersects with a front-rear direction Z (Z1, Z2) of the lawn mower 10. From within the front-rear direction Z (Z1, Z2), the front direction Z1 is a traveling direction (a forward moving direction) of the lawn mower 10. The upper-lower direction Y and the front-rear direction Z are perpendicular to each other. In FIG. 1, the axis of rotation A12 of the cutter blade 12 extends along an axial line Ay that extends in the upper-lower direction Y. The axis of rotation A12 of the cutter blade 12 may be slightly inclined with respect to the axial line Ay that extends in the upper-lower direction Y.

According to the present embodiment, the direction of rotation of the cutter blade 12 is a clockwise direction in plan view (as viewed from the top). Sharp cutting edges 12*a* are provided at end parts in the longitudinal direction of the first blade 121 and the second blade 122. The direction of rotation of the first blade 121 and the second blade 122 is determined in advance based on the orientation of the sharp cutting edges 12*a*.

A wing portion 12*b* that rises upward toward an upward direction Y1 is provided at one end part in the longitudinal direction of the first blade 121. The wing portion 12*b*, in accordance with the rotation of the first blade 121, causes an air flow (transporting air) A1 (refer to FIG. 2) to be generated in the upward direction Y1. Such an air flow A1 causes distal end portions of the grass 14 that grows on the ground surface 36 to stand up vertically. Consequently, it becomes easier for the grass 14 to come into contact with the rotating cutter blade 12. More specifically, it becomes easier for the grass 14 to be cut by the cutter blade 12. Hereinafter, a range within which the grass 14 can be mowed by the cutter blade 12 may be referred to as a mowing range MR.

As shown in FIG. 1, the housing 26 includes a motor housing (a motor accommodating unit) 38, a blade housing (a blade accommodating unit) 40, and a front housing (a protruding portion) 42. According to the present embodiment, a case will be described in which the motor housing 38, the blade housing 40, and the front housing 42 are constituted as separate members from each other. The motor housing 38, the blade housing 40, and the front housing 42 may be formed together integrally as a single body. Moreover, it should be noted that the constituent material of the housing 26 is a resin material or a metal material.

The motor housing 38 accommodates the working motor 181 (the drive source 18). Furthermore, in the motor housing 38, the battery 20, the sensor unit 22, and the control unit 24 are accommodated.

The blade housing 40 is positioned downwardly of the motor housing 38. The blade housing 40 accommodates the cutter blade 12. The blade housing 40, by covering a predetermined range around the periphery of the cutter blade 12, limits the range within which grass clippings 44 are scattered.

Figure 2:
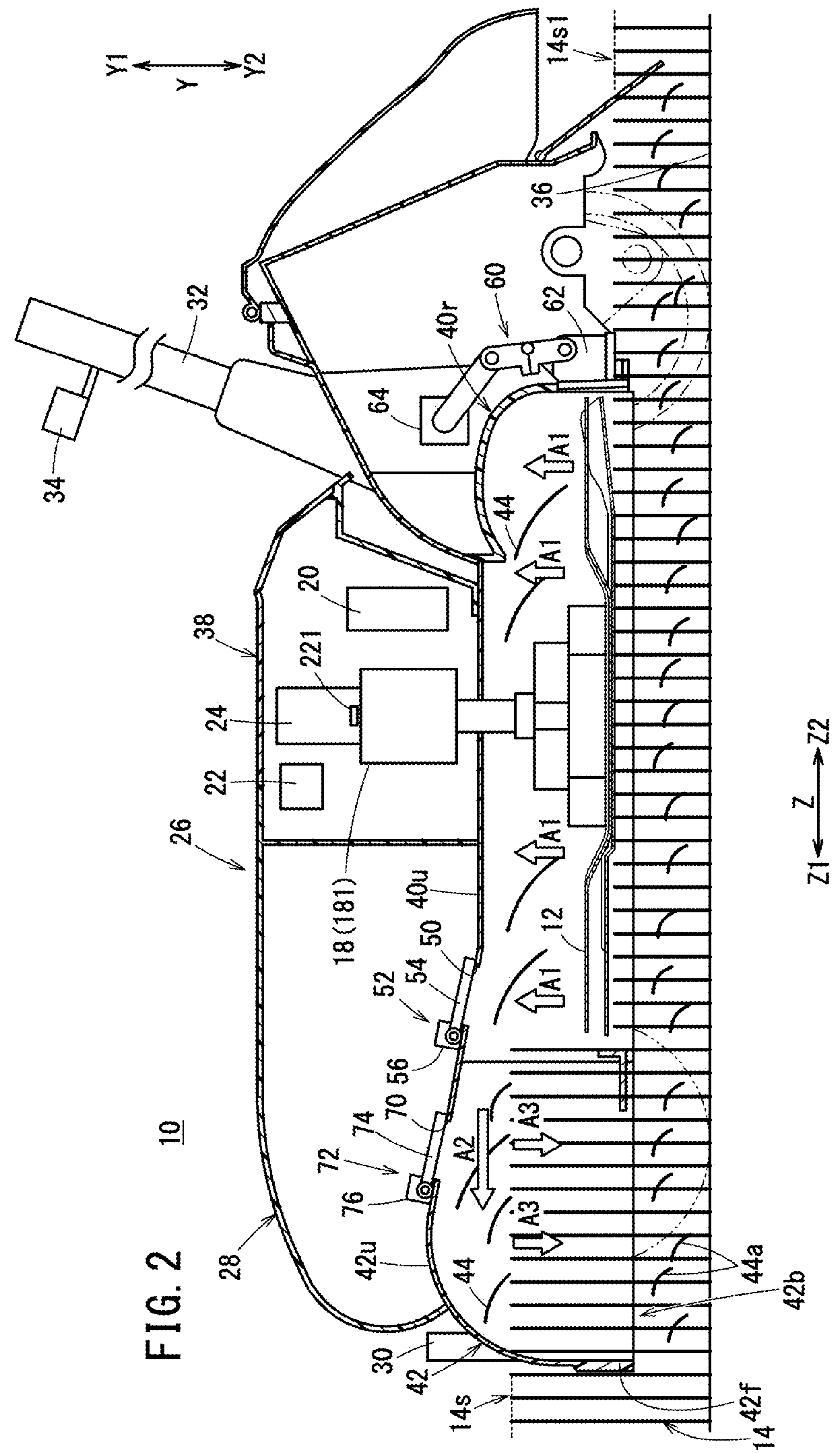
FIG. 2 is a schematic diagram showing a flowing movement of the grass clippings.

FIG. 2 is a schematic diagram showing a flowing movement of the grass clippings 44. As shown in FIG. 2, the grass clippings 44 are pieces of the grass 14 that have been cut by the cutter blade 12.

The shape of the blade housing 40, for example, is circular shaped or approximately circular shaped when viewed from an upper surface or a lower surface thereof, however, the present invention is not limited to this feature. The blade housing 40 includes an upper wall portion 40*u*, a rear portion 40*r*, and two side wall portions 40*s*.

The two side wall portions 40*s* face mutually toward each other in a vehicle widthwise direction of the lawn mower 10. The vehicle widthwise direction is a direction that intersects the front-rear direction Z and the upper-lower direction Y. The vehicle widthwise direction, together with being perpendicular to the front-rear direction Z, is perpendicular to the upper-lower direction Y. The cutter blade 12 is disposed between the two side wall portions 40*s*.

As shown in FIG. 1, the upper wall portion 40*u* is positioned upwardly of the cutter blade 12. According to the present embodiment, although the upper wall portion 40*u* serves in a dual manner as a bottom portion of the motor housing 38, the present invention is not limited to this feature. The shaft 181*s* of the working motor 181 passes through the upper wall portion 40*u*, and is connected to the cutter blade 12. The shaft 181*s* and the cutter blade 12 are connected via a blade holder 46. The upper wall portion 40*u* connects the two side wall portions 40*s* and the rear portion 40*r*. Moreover, it should be noted that the upper wall portion 40*u*, the rear portion 40*r*, and the two side wall portions 40*s* may be formed together in an integral manner.

A grass clippings transport passage (a second passage) 50 is formed in the upper wall portion 40*u* of the blade housing 40. The grass clippings transport passage 50 is an open path that places the blade housing 40 and the accommodation container 28 in communication, and is a flow path through which the grass clippings 44 are made to pass. However, the grass clippings transport passage 50 may be formed as a transport passage having a tubular shape (for example, a cylindrical or rectangular tubular shape) having a predetermined length between the blade housing 40 and the accommodation container 28. A shutter device 52 that opens or closes the grass clippings transport passage 50 is provided for the grass clippings transport passage 50.

The shutter device 52 includes a shutter 54, and the shutter actuator 56 that drives the shutter 54. The shutter 54 is formed, for example, in a substantially rectangular plate-like shape. The shutter 54 may be formed into an appropriate shape, such as a substantially rectangular shape or a substantially semicircular shape or the like, so as to match with the cross-sectional shape of the grass clippings transport passage 50. The shutter 54 is supported in the grass clippings transport passage 50, in a manner so as to be capable of being rotated at a proximal end thereof about a rotating shaft that extends in the vehicle widthwise direction.

The shutter 54 is formed to be capable of being rotated between a fully open position (degree of opening 100%) in which a distal end thereof is positioned substantially upwardly with respect to a proximal end thereof, and a main surface thereof is substantially perpendicular to the upper wall portion 40*u*, and a fully closed position (degree of opening 0%) in which the shutter is rotated rearwardly from the fully open position and the main surface thereof is aligned along the upper wall portion 40*u*. The shutter actuator 56, for example, is an electric motor, and is fixed to an upper surface side of the upper wall portion 40*u*. The shutter actuator 56 is driven by electrical power supplied from the battery 20, and applies a rotational force to the rotating shaft of the shutter 54. An example of the fully open position of the shutter 54 is shown by an imaginary line in FIG. 1.

Moreover, it should be noted that, in the fully closed position, the shutter 54 is arranged in a manner so as to overlap with a portion of the cutter blade 12 when viewed from the upper surface (in plan view). More specifically, in the case that the shutter 54 is opened, the shutter 54 is disposed at a position that enables the grass clippings 44 in the accommodation container 28 to be made to reliably fall onto the cutter blade 12.

A discharge device 60 is provided at the rear portion 40*r* of the blade housing 40. The discharge device 60 includes a cover member 62 and the cover member actuator (a cover member motor) 64. A discharge port 66 in order to discharge the grass clippings 44 in a rearward direction is formed in the rear portion 40*r* of the blade housing 40.

The cover member 62 covers the discharge port 66 in an openable and closable manner. Opening or closing of the cover member 62 is carried out using the cover member actuator 64. A degree of opening of the cover member 62 changes in accordance with the driving of the cover member actuator 64. In FIG. 1, the lawn mower 10 is shown in a state with the cover member 62 being closed.

In the case that the cover member 62 is open, the grass clippings 44 inside the blade housing 40 are discharged in a rearward direction Z2 via the discharge port 66. More specifically, the lawn mower 10 is configured as a so-called rear discharge type of lawn mower. Moreover, it should be noted that the lawn mower 10 may also be configured as a side discharge type of lawn mower in which the grass clippings 44 are discharged from a side surface of the housing 26.

The front housing 42 projects out in the frontward direction Z1 from the blade housing 40. The length of the front housing 42 in the front-rear direction Z, for example, is greater than or equal to one-third of the dimension in the longitudinal direction of the cutter blade 12. The length of the front housing 42 in the front-rear direction Z may be greater than or equal to one half of the dimension in the longitudinal direction of the cutter blade 12.

The front housing 42 includes a front wall portion 42*f*, an upper wall portion 42*u*, and two side wall portions 42*s*. A lower part 42*b* of the front housing 42 is open. The shape of the front housing 42 as viewed in plan (a top surface view), for example, is a substantially rectangular shape, however, the present invention is not necessarily limited to this feature.

The two side wall portions 42*s*, together with facing toward each other in the vehicle widthwise direction, extend along the frontward direction Z1. A rib 68 for the purpose of suppressing bending of the front housing 42 is disposed between the two side wall portions 42*s*.

The upper wall portion 42*u* is connected to the front wall portion 42*f*, the two side wall portions 42*s*, and the upper wall portion 40*u* of the blade housing 40.

A grass clippings transport passage (a first passage) 70 is formed in the upper wall portion 42*u* of the front housing 42. The grass clippings transport passage 70 is an open path that places the front housing 42 and the accommodation container 28 in communication, and is a flow path through which the grass clippings 44 are made to pass. However, the grass clippings transport passage 70 may be formed as a transport passage having a tubular shape (for example, a cylindrical or rectangular tubular shape) having a predetermined length between the front housing 42 and the accommodation container 28. A shutter device (a flow path adjustment unit) 72 that opens or closes the grass clippings transport passage 70 is provided for the grass clippings transport passage 70. The shutter device 72 includes a shutter 74 and the shutter actuator 76. The shutter device 72 has a similar configuration to that of the shutter device 52.

In order to distinguish the grass clippings transport passage 70 and the grass clippings transport passage 50 from each other, in the following description, the grass clippings transport passage 70 that is formed in the front housing 42 will be referred to as a first passage 70, and the grass clippings transport passage 50 that is formed in the blade housing 40 will be referred to as a second passage 50.

Similarly, the shutter device 72 provided for the front housing 42 will be referred to as a first shutter device 72, and the shutter 74 and the shutter actuator 76 will be referred to respectively as a first shutter 74 and a first shutter actuator 76. The shutter device 52 provided for the blade housing 40 will be referred to as a second shutter device 52, and the shutter 54 and the shutter actuator 56 will be referred to respectively as a second shutter 54 and a second shutter actuator 56.

The first shutter 74 is formed to be capable of being rotated between a fully open position (degree of opening 100%) in which a distal end thereof is positioned substantially upwardly with respect to a proximal end thereof, and a main surface thereof is substantially perpendicular to the upper wall portion 42*u*, and a fully closed position (degree of opening 0%) in which the first shutter is rotated rearwardly from the fully open position and the main surface thereof is aligned along the upper wall portion 42*u*. An example of the fully open position (degree of opening 100%) of the first shutter 74 is shown by an imaginary line in FIG. 1.

The first shutter 74 may be configured in a manner so as to be capable of being rotated further toward the frontward direction from the fully open position (degree of opening 100%) to a position in which the main surface thereof is aligned along the upper wall portion 42*u* (degree of opening 200%), i.e., a position that is rotated substantially 180 degrees from the fully closed position (degree of opening 0%).

As shown in FIG. 1, the front housing 42 communicates with the blade housing 40. An opening portion 80 is formed in a front end part 40*f* of the blade housing 40, and the blade housing 40 and the front housing 42 communicate with each other through the opening portion 80. A single space 82 is constituted by the blade housing 40 and the front housing 42. An air flow A1 in the upward direction Y1 shown in FIG. 2 is generated inside the space 82.

The air flow A1 collides against the upper wall portion 40*u* of the blade housing 40, and thereby becomes an air flow A2 that flows toward the frontward direction Z1. Due to the air flow A2, the grass clippings 44 that are cut by the cutter blade 12 flow from the blade housing 40 into the front housing 42. Stated otherwise, via the opening portion 80, the grass clippings 44 are transported outside of the mowing range MR of the cutter blade 12. More specifically, via the opening portion 80, the grass clippings 44 are transported out in the frontward direction of the blade housing 40.

As shown in FIG. 2, at a time when the first shutter 74 is in the fully closed position, and the second shutter 54 is in the fully closed position, the air flow A2 that flows toward the frontward direction Z1 collides against the front wall portion 42*f*, and thereby becomes the air flow A3 that flows in the downward direction Y2. The lower part 42*b* of the front housing 42 is open. Therefore, due to the air flow A3, the grass clippings 44 inside the front housing 42 fall down onto a grass surface (a lawn surface) 14*s* in front of the cutter blade 12. In this manner, the operation mode in which the grass clippings 44 are discharged (scattered) from downwardly of the housing 26 onto the grass surface 14*s* is referred to as a "mulching mode".

Figure 3:
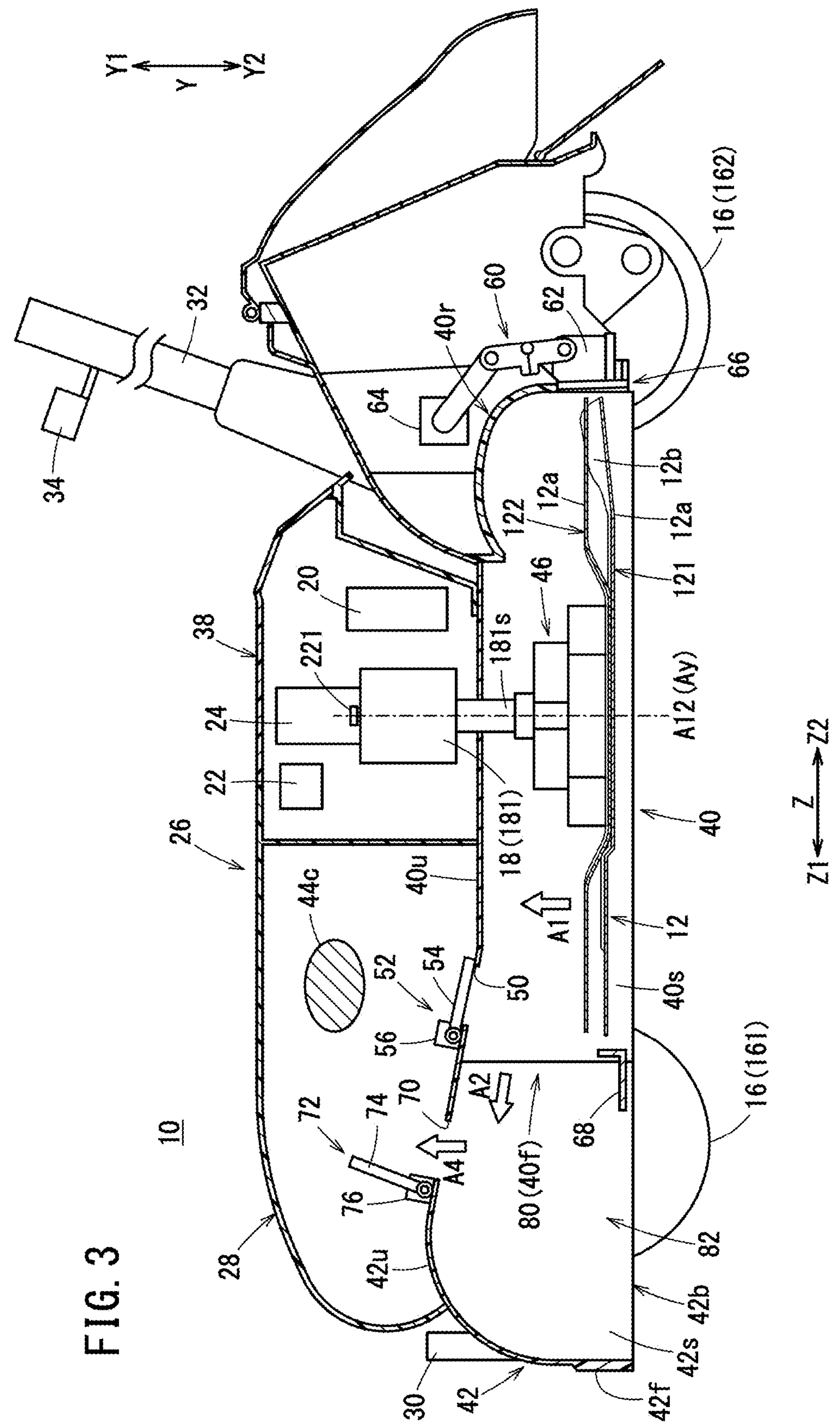
FIG. 3 is a schematic diagram showing a flow of transporting air.

FIG. 3 is a schematic diagram showing a flow of the transporting air. As shown in FIG. 3, when the first shutter 74 is in an open position that excludes the fully closed position, and the second shutter 54 is in the fully closed position, the air flow A2 that flows toward the frontward direction Z1 collides against the front wall portion 42*f*, and thereby becomes an air flow A4 that primarily flows toward the upward direction Y1. The air flow A4 flows toward the first passage 70. The air flow A4 and the grass clippings 44 pass through the first passage 70 and flow into the accommodation container 28, and the grass clippings 44 are collected in the accommodation container 28. In FIG. 3, clumps 44*c* of the grass clippings 44 that are collected in the accommodation container 28 are shown. In this manner, the operation mode in which the grass clippings 44 are transported into the accommodation container 28 that is provided on the upper part of the front housing 42 is referred to as a "bagging mode".

Figure 4:
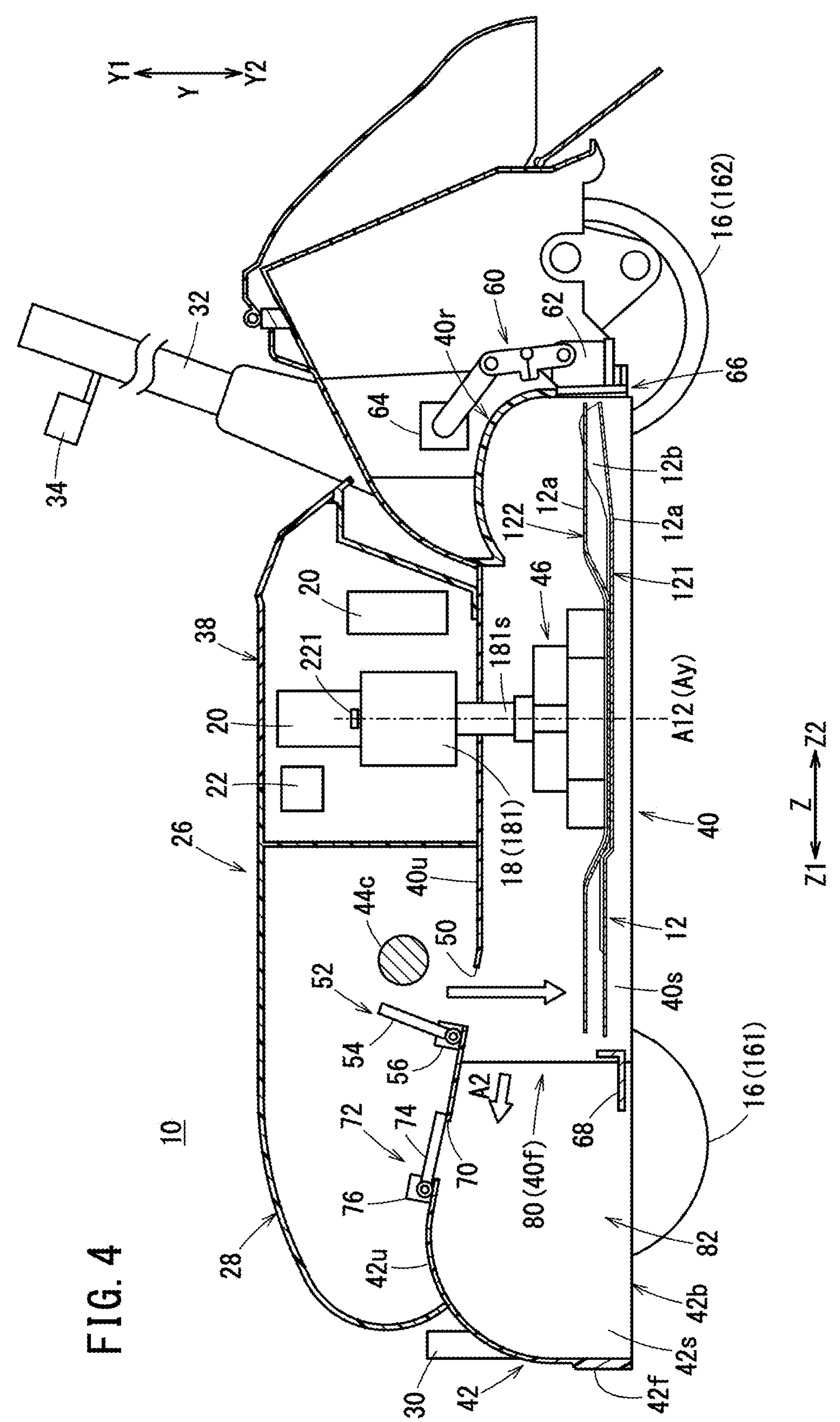
FIG. 4 is a schematic diagram showing the flow of the transporting air.

FIG. 4 is a schematic diagram showing the flow of the transporting air. As shown in FIG. 4, when the first shutter 74 is in the fully closed position, and the second shutter 54 is in an open position that excludes the fully closed state, the clumps 44*c* of the grass clippings 44 that are accommodated in the accommodation container 28 pass through the second passage 50 in opposition to the air flow A1 in the upward direction Y1, and fall down onto the cutter blade 12. The clumps 44*c* of the grass clippings 44 that have fallen down onto the cutter blade 12 are cut again by the cutter blade 12. In this manner, the operation mode in which the grass clippings 44 that are accommodated in the accommodation container 28 are delivered back (sent back) into the blade housing 40 and cut again by the cutter blade 12 is referred to as a "returning flow (return) mode". Moreover, it should be noted that in the returning flow mode, as well as in the mulching mode, the grass clippings 44 are discharged (scattered) from downwardly of the housing 26 onto the grass surface 14*s*.

In the mulching mode, grass clippings 44*a* that have been sufficiently shredded by the cutter blade 12 can pass through the grass surface 14*s*, and as shown in FIG. 2, can fall down until reaching downwardly of the grass surface 14*s*. The grass clippings 44*a* that have entered in downwardly of the grass surface 14*s* are less noticeable. Therefore, the beauty of grass surface 14*s*1 after the lawn mower 10 has passed thereover and has cut the grass 14 is not marred.

On the other hand, the grass clippings 44 that are not sufficiently shredded will adhere to the grass surface 14*s* downwardly of the front housing 42. In the case that the workload of the grass surface is not high, accompanying the lawn mower 10 moving forward, the grass clippings 44 that have adhered to the grass surface 14*s* are cut again by the cutter blade 12. Consequently, the grass clippings 44 that have adhered to the grass surface 14*s* are more finely shredded.

However, in the case that the workload of the grass surface is high, there is a possibility that the cutter blade 12 may be incapable of sufficiently shredding the grass clippings 44 that have adhered to the grass surface 14*s*. In such a case, the control unit 24 switches the operation mode from the mulching mode to the bagging mode, and temporarily accommodates the grass clippings 44 in the accommodation container 28. Thereafter, when the workload of the grass surface has become lighter, the control unit 24 switches the operation mode from the bagging mode to the returning flow mode. The clumps 44*c* of the grass clippings 44 that are accommodated in the accommodation container 28 are delivered back into the blade housing 40, and are cut again by the cutter blade 12. Consequently, the grass clippings 44 that have been sufficiently shredded can be discharged (scattered) onto the grass surface 14*s* from downwardly of the housing 26.

In this manner, according to the present embodiment, the grass clippings 44 that have been sufficiently shredded are transported in front of the mowing range MR of the cutter blade 12. The lawn mower 10 is capable of appropriately switching between the mulching mode, the bagging mode, and the returning flow mode in accordance with the workload of the lawn surface. Consequently, the grass clippings 44 can continue to be shredded until the grass clippings 44 become of a degree that enables the grass clippings 44 to enter in downwardly of the grass surface 14*s*. Therefore, the grass clippings 44 are less likely to remain on the grass surface 14*s*1 after the lawn mower 10 has passed over the same.

Stated otherwise, the lawn mower 10 that has been discussed above includes a transporting out section 84 and a transporting in section 86. The transporting out section 84 transports the grass clippings 44 outside of the mowing range MR of the cutter blade 12. The aforementioned opening portion 80 is included in the transporting out section 84. By the grass clippings 44 being transported outside of the mowing range MR, the amount of the grass clippings 44 that remain in a stagnating state inside the blade housing 40 is suppressed. As a result, an increase in the load that is applied to the cutter blade 12 is suppressed.

As noted previously, the grass clippings 44 undergo flowing movement due to the air flows (A1, A2, A3, and A4) generated by the cutter blade 12. In other words, by utilizing the air flows (A1, A2, A3, and A4) generated by the cutter blade 12, the transporting out section 84 is capable of outwardly transporting the grass clippings 44. More specifically, by making use of a difference in the air pressure between the air pressure inside the blade housing 40, which is an outwardly transporting source, and the air pressure outside of the blade housing 40, which is an outwardly transported destination, the transporting out section 84 is capable of outwardly transporting the grass clippings 44 to the exterior of the mowing range MR of the cutter blade 12.

The transporting in section 86 is capable of inwardly transporting the grass clippings 44 that have been outwardly transported to the exterior of the mowing range MR again into the mowing range MR. The transporting in section 86 includes the plurality of wheels 16 that cause the lawn mower 10 to move forward, and an opening formed in a lower part of the blade housing 40. Furthermore, the transporting in section 86 may include the accommodation container 28, the first passage 70, the second passage 50, the first shutter device 72, and the second shutter device 52. The lawn mower 10 is capable of finely cutting the grass clippings 44 that have been inwardly transported again into the mowing range MR.

Next, a description will be given with reference to FIG. 5 to FIG. 8 concerning operations of the control unit 24 to switch between the operation modes (the mulching mode, the bagging mode, and the returning flow mode) of the lawn mower 10.

Figure 5:
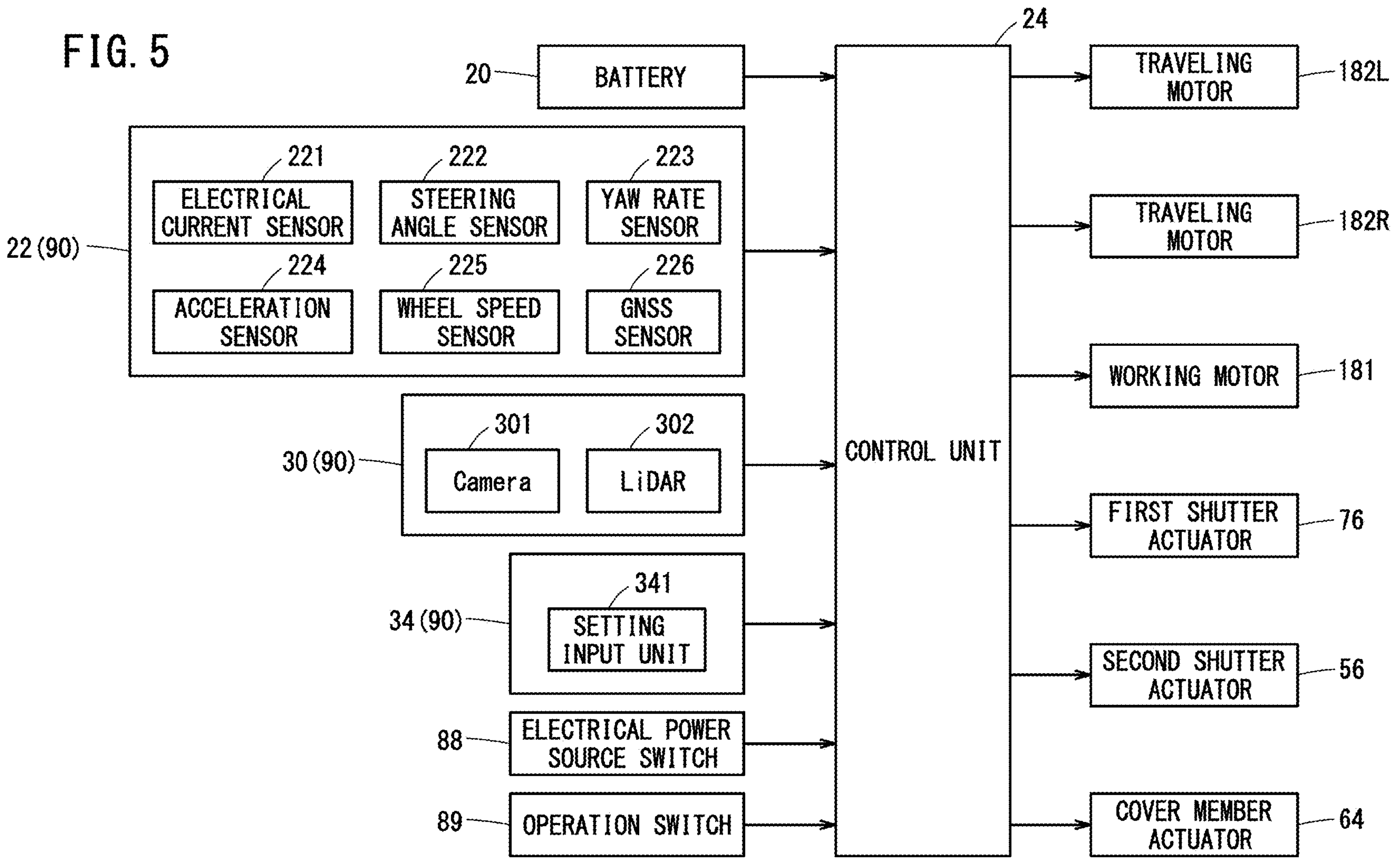
FIG. 5 is a block diagram showing the configuration of a control system of the lawn mower.

FIG. 5 is a block diagram showing the configuration of the control system of the lawn mower 10.

As shown in FIG. 5, the sensor unit 22 is equipped with various sensors. As the various sensors, there can be exemplified an electrical current sensor 221 that detects a value of an electrical current supplied to the working motor 181, a steering angle sensor 222, a yaw rate sensor 223, an acceleration sensor 224, a wheel speed sensor 225, and a GNSS (Global Navigation Satellite System) sensor 226, and the like. Apart therefrom, in the various sensors, there may be included a gyro sensor, a blade height sensor, a steering sensor, a temperature sensor, a humidity sensor, a soil moisture sensor, and the like. The sensor unit 22 transmits the outputs of the various sensors to the control unit 24.

The external environment recognition unit 30 includes, for example, a camera 301 that is capable of capturing images and videos of an area in front of the lawn mower 10. The external environment recognition unit 30 is disposed at a height corresponding to the grass 14 that has grown on the ground surface 36. The external environment recognition unit 30 outputs to the control unit 24 the captured image information (external environment recognition information) such as the videos and the images that have been captured. The external environment recognition unit 30 may further be equipped with a LiDAR (Light Detection and Ranging) device 302, an ultrasonic sensor, a Radar (Radio Detecting and Ranging) device, and the like.

The display device 34, for example, is a touch sensitive type of panel display. The display device 34 may be a liquid crystal panel or an organic EL panel. The display device 34 includes a setting input unit 341 that is capable of receiving from the user various settings for the lawn mower 10. The setting input unit 341, for example, displays selections for the operation mode. The setting input unit 341 may further display a map 410 in which the operation areas for the lawn mower 10 are displayed in a divided manner, and the selections for the traveling mode (traveling patterns) for the lawn mower 10. The user, for example, is capable of setting an operation mode and a traveling mode for each of the respective operation areas. The display device 34 outputs to the control unit 24 the setting information that was input to the setting input unit 341.

The control unit 24 controls each of the components of the lawn mower 10, based on signals or the like from the sensor unit 22, the external environment recognition unit 30, and the setting input unit 341. The control unit 24, for example, controls the amount of opening or closing (the degree of opening) of the first shutter 74 and the second shutter 54, and thereby switches the operation mode of the lawn mower 10.

Figure 6:
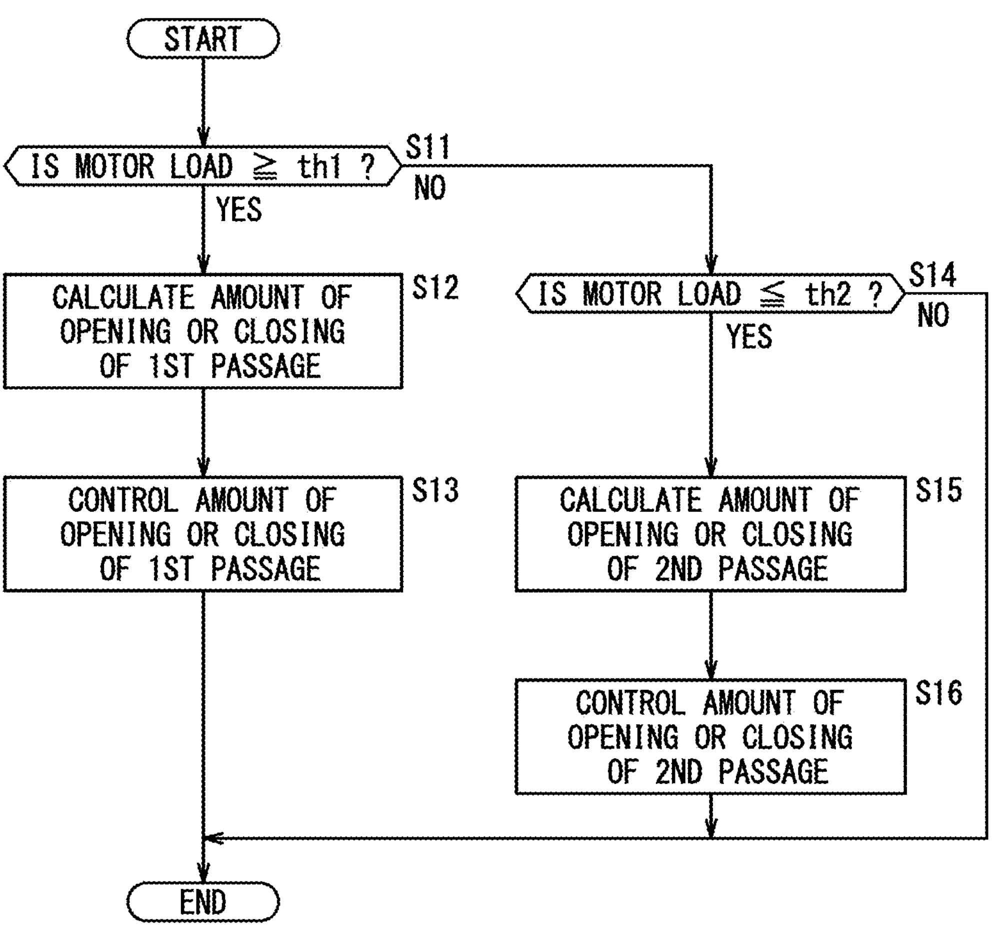
FIG. 6 is a flowchart showing a process flow of a passage opening or closing amount control which is executed by the lawn mower according to the first embodiment.

FIG. 6 is a flowchart showing a process flow of a passage opening or closing amount control which is executed by the lawn mower 10 according to the first embodiment. Moreover, in an initial state, both of the first passage 70 and the second passage 50 are in the fully closed position, and the operation mode is set to the mulching mode.

For example, when an electrical power source switch 88 and an operation switch 89 are turned ON, and driving of the working motor 181 is initiated, the control unit 24 starts the passage opening or closing amount control shown in FIG. 6.

In step S11, the control unit 24 determines whether or not a load on the cutter blade 12 is greater than or equal to a first predetermined value th1.

The load that is applied to the cutter blade 12 is a resistance force that the cutter blade 12 receives from the object to be cut. The object to be cut is basically the grass 14 that grows on the ground surface 36, however, the object to be cut may also include cut pieces of the grass 14 (the grass clippings 44) that exist within the interior of the blade housing 40 after having been cut by the cutter blade 12. As the amount of the object to be cut becomes more plentiful, the load that is applied to the cutter blade 12 increases.

For example, as the grass 14 that grows on the ground surface 36 becomes longer, the load that is applied to the cutter blade 12 becomes greater.

Thus, in the lawn mower 10 according to the first embodiment, the load on the cutter blade 12 is determined based on a motor load. The motor load, specifically, is a value of the electrical current (a motor current value) that is supplied to the working motor 181. The value of the electrical current supplied to the working motor 181 is detected by the electrical current sensor 221.

In the case that the motor load (the motor current value) is greater than or equal to the first predetermined value th1 (step S11: YES), the control unit 24 is capable of determining that the load on the cutter blade 12 is high. In step S12, the control unit 24 calculates the amount of opening or closing (the degree of opening) of the first passage 70.

Figure 7:
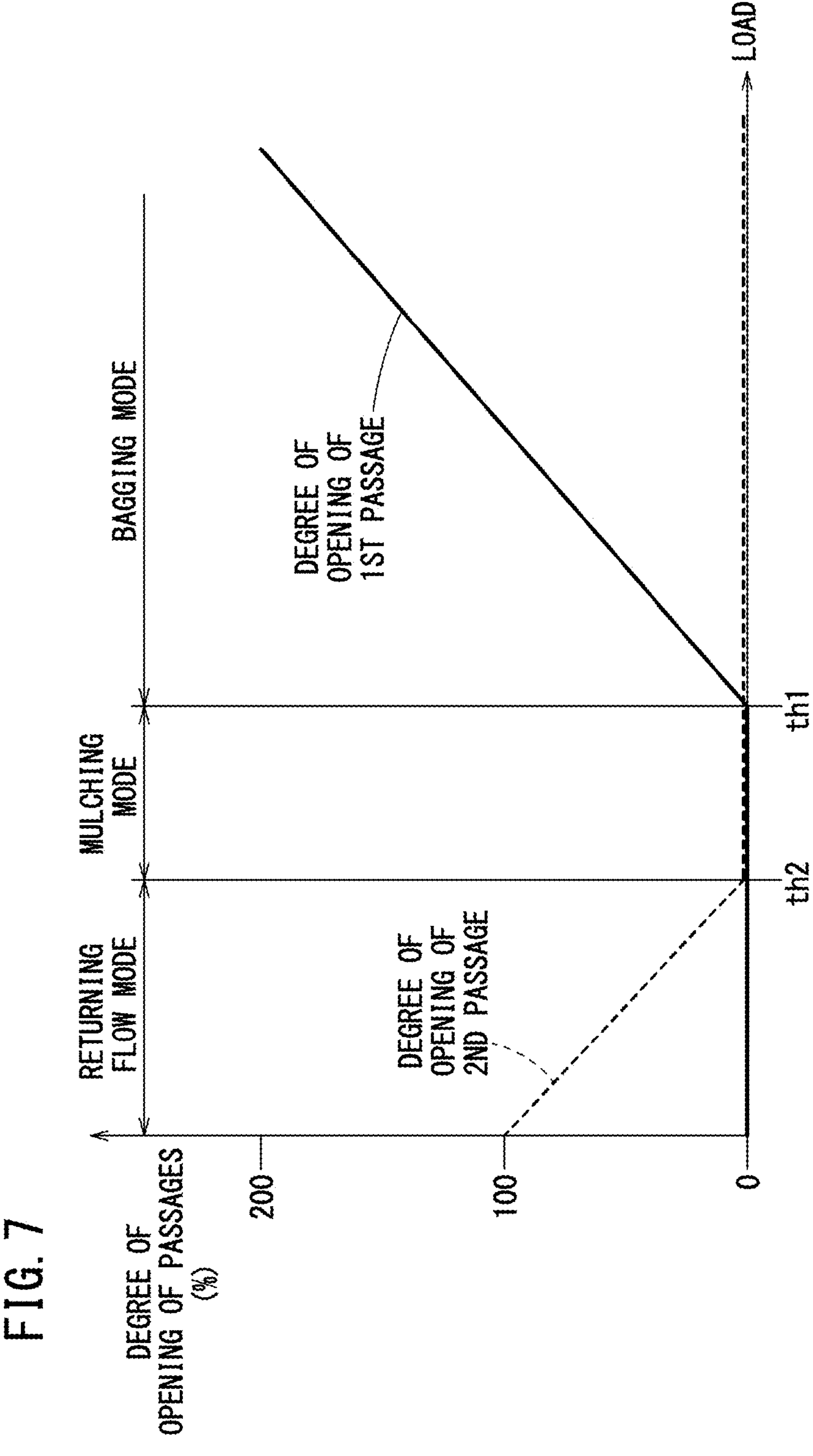
FIG. 7 is an explanatory diagram showing an example of a relationship between a load and a degree of opening of a first passage and a second passage.

FIG. 7 is an explanatory diagram showing an example of a relationship between the load and the degree of opening (the amount of opening or closing) of the first passage 70, and a relationship between the load and the degree of opening (the amount of opening or closing) of the second passage 50. The control unit 24, by referring to FIG. 7, is capable of calculating (acquiring) the amount of opening or closing of the first passage 70 corresponding to the value of the motor load.

In FIG. 7, in the case that the load is greater than or equal to the first predetermined value th1, as the load becomes higher, the amount of opening or closing of the first passage 70 becomes greater. Further, in the case that the load is less than or equal to a second predetermined value th2, as the load becomes higher, the amount of opening or closing of the second passage 50 becomes smaller. The relationship between the load and the amount of opening or closing of the first passage 70 and the second passage 50 is determined in advance through experiments or the like, and is stored in the memory of the control unit 24.

In step S13, based on the value calculated in step S12, the control unit 24 controls the amount of opening or closing of the first passage 70. Specifically, the control unit 24 drives the first shutter actuator 76, thus causing the first shutter 74 to be rotated to a desired degree of opening, and thereby opening the first passage 70. Consequently, the front housing 42 and the accommodation container 28 are placed in communication with each other. By the air flow A4 that flows in the upward direction Y1, the grass clippings 44 are delivered into the accommodation container 28.

In this manner, in the case that the load on the cutter blade 12 is high (i.e., in the case that the amount of the object to be cut is plentiful), the lawn mower 10 according to the first embodiment opens at least a portion of the first passage 70. Stated otherwise, in the case that the load on the cutter blade 12 is high, the control unit 24 switches the operation mode to the bagging mode. The control unit 24 is capable of transporting the grass clippings 44 that are not sufficiently shredded into the accommodation container 28. Consequently, the clumps 44*c* of the grass clippings 44 and the large pieces of the grass clippings 44 are prevented from falling down onto the grass surface 14*s*, and the appearance of the grass surface 14*s* is prevented from becoming worsened after the operation.

On the other hand, in the case that the motor load (the motor current value) is less than the first predetermined value th1 (step S11: NO), then in step S14, the control unit 24 determines whether or not the motor load (the motor current value) is less than or equal to the second predetermined value th2. The second predetermined value th2 is a threshold value that is less than the first predetermined value th1.

In the case that the motor load (the motor current value) is less than or equal to the second predetermined value th2 (step S14: YES), the control unit 24 is capable of determining that the load on the cutter blade 12 is low. In step S15, the control unit 24 calculates the amount of opening or closing (the degree of opening) of the second passage 50.

The control unit 24, by referring to FIG. 7, is capable of calculating (acquiring) the amount of opening or closing of the second passage 50 corresponding to the value of the motor load.

In step S16, based on the value calculated in step S15, the control unit 24 controls the amount of opening or closing of the second passage 50. Specifically, the control unit 24 drives the second shutter actuator 56, thus causing the second shutter 54 to be rotated to a desired degree of opening, and thereby opening the second passage 50.

Consequently, the accommodation container 28 and the blade housing 40 are placed in communication with each other. The clumps 44*c* of the grass clippings 44 that are accommodated in the accommodation container 28 undergo flowing movement in the second passage 50 toward the downward direction Y2 in opposition to the air flow A1. The grass clippings 44 that have fallen down onto the cutter blade 12 are cut again by the cutter blade 12.

In this manner, in the case that the load on the cutter blade 12 is low (i.e., in the case that the amount of the object to be cut is small), the lawn mower 10 according to the first embodiment opens the second passage 50 (step S14: YES). Stated otherwise, in the case that the load on the cutter blade 12 is low, the control unit 24 switches the operation mode to the returning flow mode. In accordance with this feature, the capacity of the accommodation container 28 is prevented from becoming full. The length of the operation time period of the lawn mowing operation can be secured.

Furthermore, in step S14, depending on whether or not the motor load (the motor current value) is less than or equal to the second predetermined value th2, the lawn mower 10 according to the first embodiment determines whether or not to deliver the grass clippings 44 back into the housing 26. More specifically, only in the case that the load on the cutter blade 12 is particularly light, the grass clippings 44 are returned from the accommodation container 28 into the blade housing 40. In accordance with this feature, the amount of the grass clippings 44 that are discharged from downwardly of the housing 26 can be made equal between the mulching mode and the returning flow mode.

Moreover, in step S14, in the case that the motor load (the motor current value) is greater than the second predetermined value th2 (step S14: NO), the control unit 24 is capable of determining that the load on the cutter blade 12 is neither high nor low. In this case, the control unit 24 maintains the first passage 70 and the second passage 50 in the fully closed position. More specifically, the control unit 24, without switching the operation mode, maintains the mulching mode.

While the lawn mower 10 is in operation, the control unit 24 repeatedly executes the passage opening or closing amount control in this manner, and thereby automatically switches the operation mode in accordance with the load on the cutter blade 12.

Figure 8:
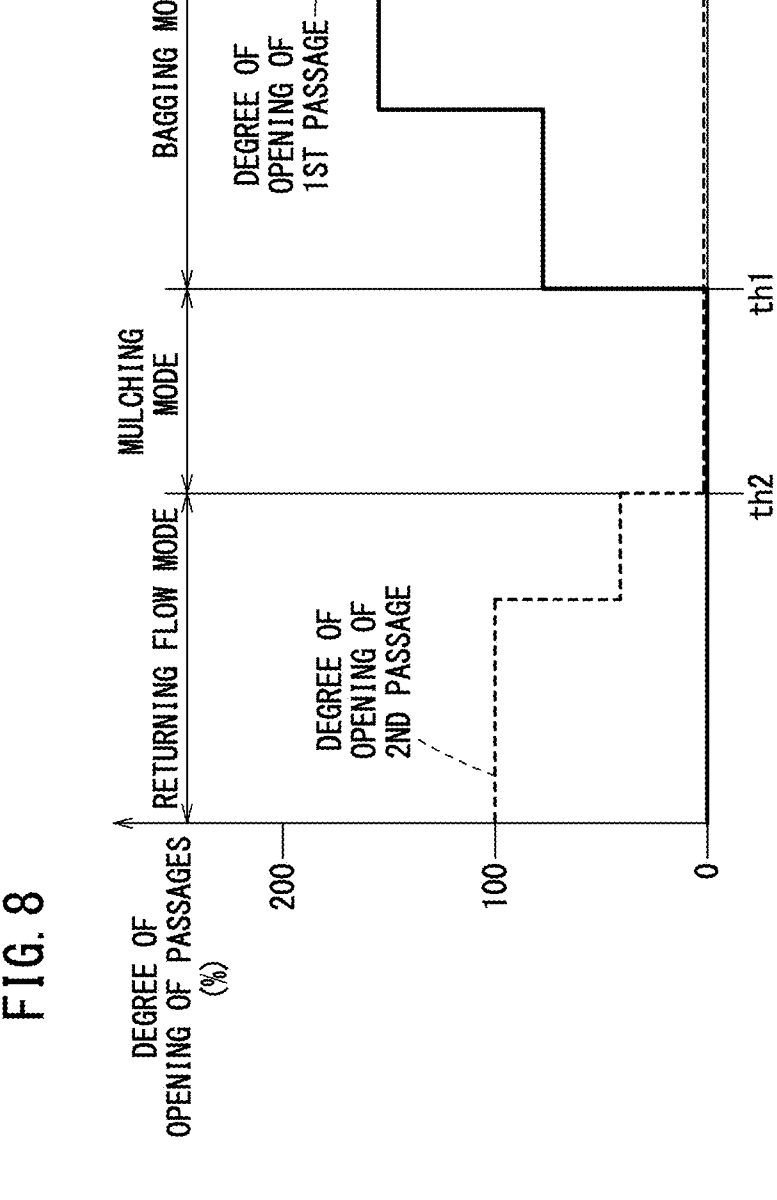
FIG. 8 is an explanatory diagram showing another example of the relationship between the load and the degree of opening of the first passage and the second passage.

Moreover, in the step of calculating the amount of opening or closing of the first passage 70 (step S12), and the step of calculating the amount of opening or closing of the second passage 50 (step S15), instead of the relationship shown in FIG. 7, the control unit 24 may use the relationship shown in FIG. 8.

FIG. 8 is an explanatory diagram showing an example of a relationship between the load on the cutter blade 12 and the degree of opening (the amount of opening or closing) of the first passage 70, and a relationship between the load on the cutter blade 12 and the degree of opening (the amount of opening or closing) of the second passage 50. In FIG. 8, the amounts of opening or closing of the first passage 70 and the second passage 50, which are defined in a plurality of separate stages (in a step-like manner) in accordance with the load, are shown. Based on FIG. 8, the control unit 24 may change the amounts of opening or closing of the first passage 70 and the second passage 50 in a stepwise manner.

Moreover, it should be noted that the device that adjusts the amount of opening or closing (the degree of opening) of the first passage 70 is not limited to being the first shutter device 72. For example, as shown in FIG. 9, a third shutter device 92 that differs from the first shutter device 72 may be provided in close proximity to the first passage 70.

Figure 9:
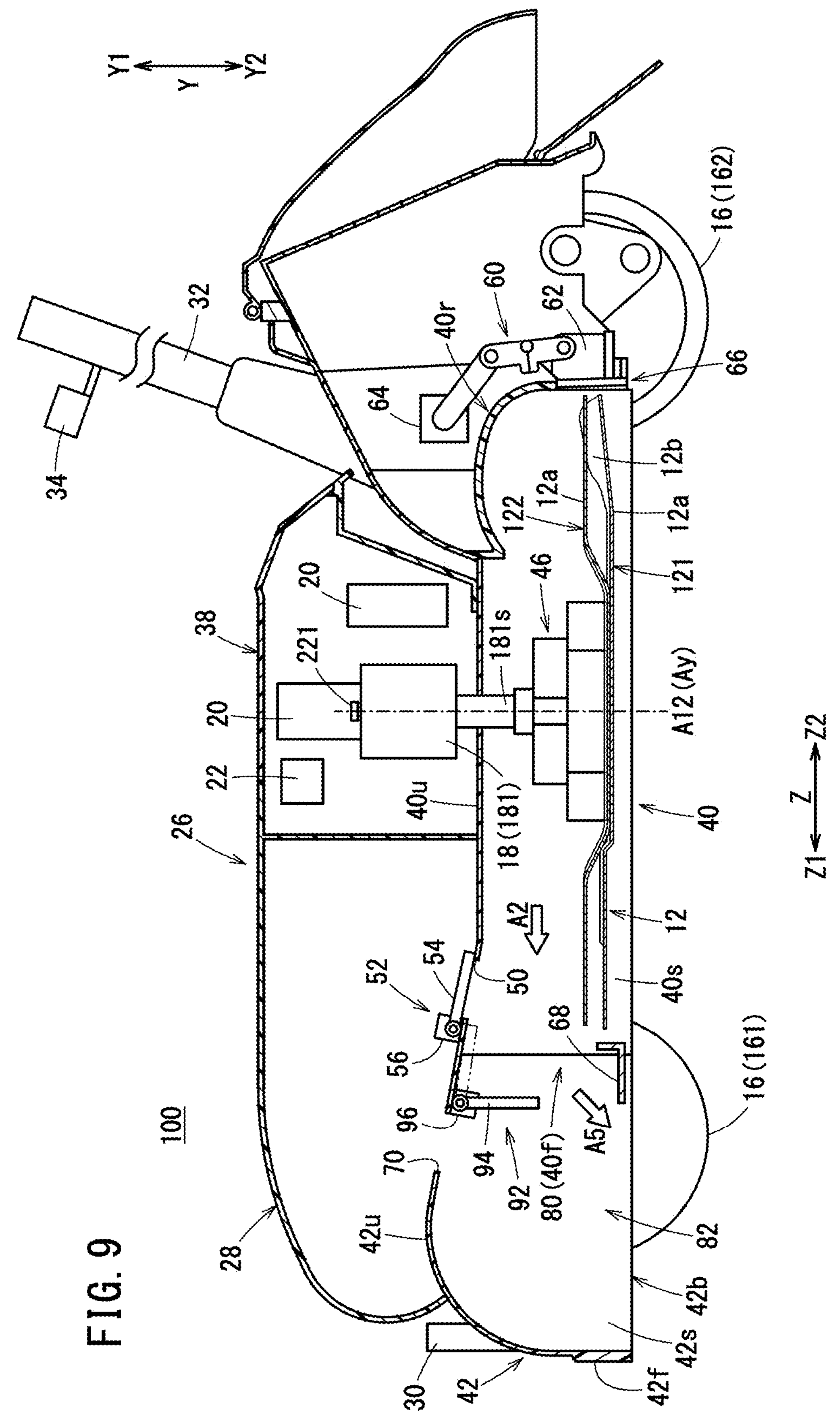
FIG. 9 is a schematic cross-sectional side view of a lawn mower according to an exemplary modification.

FIG. 9 is a schematic cross-sectional side view of a lawn mower 100 according to an exemplary modification. As shown in FIG. 9, in the lawn mower 100 according to the exemplary modification, the third shutter device (the flow path adjustment unit) 92 is disposed slightly rearwardly of the first passage 70, and on a side on the lower surface of the upper wall portion 42*u*.

The third shutter device 92 includes a third shutter 94, and a third shutter actuator 96 that drives the third shutter 94. The third shutter 94 is formed to be capable of being rotated between an air flow obstructing position that faces downward and obstructs the flow of the air flow A2, and a free air flow pass-through position that does not obstruct the flow of the air flow A2. In FIG. 9, an example of the third shutter 94 in the air flow obstructing position is shown by a solid line, and an example of the third shutter 94 in the free air flow pass-through position is shown by an imaginary line.

In the air flow obstructing position, a distal end of the third shutter 94 is positioned substantially downwardly with respect to the proximal end, and a main surface of the third shutter 94 is substantially perpendicular to the upper wall portion 40*u*. On the other hand, in the free air flow pass-through position, the third shutter 94 is rotated rearwardly from the air flow obstructing position, and the main surface of the third shutter 94 is aligned along the upper wall portion 40*u*.

When the third shutter 94 is in the air flow obstructing position, and the second shutter 54 is in the fully closed position, the air flow A2 that flows toward the frontward direction Z1 collides against the third shutter 94, and thereby becomes an air flow A5 that flows in the downward direction Y2. Due to the air flow A5, the grass clippings 44 inside the front housing 42 fall down onto the grass surface (the lawn surface) 14*s* in front of the cutter blade 12. Consequently, the "mulching mode" is realized in the lawn mower 100 according to the exemplary modification.

When the third shutter 94 is in the free air flow pass-through position shown by the imaginary line in FIG. 9, and the second shutter 54 is in the fully closed position, the air flow A2 that flows toward the frontward direction Z1 collides against the front wall portion 42*f*. At this time, the air flow A2 becomes the air flow A4 (refer to FIG. 3) that primarily flows in the upward direction Y1. The airflow A4 flowing in the upward direction Y1 flows toward the first passage 70. The air flow A4 and the grass clippings 44 pass through the first passage 70 and flow into the accommodation container 28, and the grass clippings 44 are collected in the accommodation container 28. Consequently, the "bagging mode" is realized in the lawn mower 100 according to the exemplary modification.

Furthermore, when the third shutter 94 is in the air flow obstructing position shown by the solid line in FIG. 9, and the second shutter 54 is in an open position that excludes the fully closed state, the clumps 44*c* of the grass clippings 44 that are accommodated in the accommodation container 28 pass through the second passage 50 in opposition to the air flow A1. The grass clippings 44 that have fallen down onto the cutter blade 12 are cut again by the cutter blade 12. Consequently, the "returning flow (return) mode" is realized in the lawn mower 100 according to the exemplary modification.

In this manner, by causing the third shutter 94 to be rotated between the air flow obstructing position and the free air flow pass-through position, the third shutter device 92 is capable of adjusting the flow of the grass clippings 44 that pass through the first passage 70. Stated otherwise, the third shutter device 92 functions as a flow path adjustment unit that adjusts the flow in the first passage 70.

Moreover, as shown in FIG. 1, the first shutter device 72 causes the first shutter 74 to be rotated between the fully closed position and the fully open position, and thereby adjusts the flow in the first passage 70. Stated otherwise, the first shutter device 72 functions as a flow path adjustment unit that adjusts the flow in the first passage 70. Accordingly, the flow path adjustment unit includes the first shutter device 72 and the third shutter device 92.

Further, in the lawn mower 100 according to the exemplary modification, the third shutter 94 need not necessarily rotate. More specifically, insofar as the air flow A4 that passes through the first passage 70 and the flow of the grass clippings 44 are capable of being adjusted (allowed to pass through or to be obstructed), the third shutter 94 can be configured in a manner so as to be displaced either manually or automatically in the upper-lower direction Y. Further, when viewed from the side of the lawn mower 100, the third shutter 94 is capable of being arranged at any arbitrary position between the axis of rotation A12 of the cutter blade 12 and the first passage 70.

Moreover, the lawn mower 100 according to the exemplary modification may be configured in a manner so that the height of the cutter blade 12 is capable of being adjusted in the upper-lower direction Y. In the case that the load on the cutter blade 12 is high, in the lawn mower 100, the height of the cutter blade 12 may be made higher, and thereby the amount of the grass 14 that is cut may be reduced.

Further, in the lawn mower 100 according to the exemplary modification, the accommodation container 28 need not necessarily be attached to the front upper surface of the housing 26. The accommodation container 28 may be arranged in any arbitrary position insofar as it remains in communication with the first passage 70. For example, the accommodation container 28 may be disposed rearwardly or to the side of the housing 26.

Second Embodiment

Next, with reference to FIG. 10 and FIG. 11, a description will be given concerning a lawn mower 200 according to a second embodiment.

The lawn mower 200 according to the second embodiment differs from the lawn mower 10 according to the first embodiment, in that the load on the cutter blade 12 is determined based on the state of the work object (the grass 14). More specifically, rather than using the motor load (the motor current value), the lawn mower 200 switches between the operation modes using the state of the work object (the grass 14). Hereinafter, the same reference numerals are applied to the same constituent elements and the same processes that are common with those of the lawn mower 10 according to the first embodiment, and description of such features will be omitted.

FIG. 10 is a flowchart showing a process flow of a passage opening or closing amount control which is executed by the lawn mower 200 according to the second embodiment.

In step S21, the control unit 24 determines whether or not the state of the work object (the grass 14) is greater than or equal to a first predetermined value th1. The state of the work object (the grass 14) includes at least one of a height of the work object (the height of the grass 14), the density of the work object (the density of the grass 14), the type of the work object (the type of the grass 14), or the wetness of the work object (the wetness of the grass 14).

For example, in the case that the grass 14 is growing tall or the grass 14 is dense, the amount of the grass 14 that the cutter blade 12 cuts becomes more plentiful, and the load that is applied to the cutter blade 12 becomes greater. In the case that the grass 14 is wet, the load that is applied to the cutter blade 12 becomes greater. It is known that a hardness of the grass 14 differs depending on the type of the grass. In the case that the grass 14 is hard, the load that is applied to the cutter blade 12 becomes greater.

Thus, the lawn mower 200 according to the second embodiment determines the load on the cutter blade 12 based on the state of the work object (the grass 14). To determine the state of the work object (the grass 14), image information of the grass 14 which is captured, for example, by the camera 301 is used. However, without being limited to this feature, apart from the camera 301, the external environment recognition information, which is recognized by the LiDAR device 302, an ultrasonic sensor, a radar, or any combination of these methods, may be used.

In the process of determining the state of the work object (the grass 14), the control unit 24 can utilize a well-known image recognition technology. The control unit 24, for example, may utilize an image recognition technology that makes use of machine learning. A method for generating a model using machine learning may be supervised learning, unsupervised learning, or reinforcement learning. In such a learning process, a learning method that makes use of neural network technology, deep learning technology, or the like may be used. For example, the process disclosed in US 20190313576 A1 may be used as the process of determining the state of the grass 14.

In this instance, an example will be described in which the load on the cutter blade 12 is determined based on a height of the grass 14. FIG. 11 shows an example of image data of the grass 14 which is captured by the external environment recognition unit 30. In the case that the height of the grass 14 is greater than or equal to the first predetermined value th1, the control unit 24 determines that the state of the work object (the grass 14) satisfies the first predetermined condition (step S21: YES).

In step S22, the control unit 24 calculates the amount of opening or closing (the degree of opening) of the first passage 70. The control unit 24, by referring for example to the graph shown in FIG. 7, is capable of calculating (acquiring) the amount of opening or closing of the first passage 70 corresponding to the height of the grass 14. In step S23, the control unit 24 opens at least a portion of the first passage 70, and thereby switches the operation mode to the bagging mode.

On the other hand, in the case that the height of the grass 14 is less than the first predetermined value th1 (step S21: NO), then in step S24, the control unit 24 determines whether or not the height of the grass 14 is less than or equal to the second predetermined value th2. As shown in FIG. 11, the second predetermined value th2 may be a height of the grass 14 that is lower than the first predetermined value th1.

In the case that the height of the grass 14 is less than or equal to the second predetermined value th2, the control unit 24 determines that the state of the work object (the grass 14) satisfies the second predetermined condition (step S24: YES). In step S25, the control unit 24 calculates the amount of opening or closing (the degree of opening) of the second passage 50. The control unit 24, by referring for example to the graph shown in FIG. 7, is capable of calculating (acquiring) the amount of opening or closing of the second passage 50 corresponding to the height of the grass 14. In step S26, the control unit 24 opens the second passage 50, and thereby switches the operation mode to the returning flow mode.

In the case that the height of the grass 14 is greater than the second predetermined value th2, the control unit 24 is capable of determining that the height of the grass 14 is neither high nor low (step S24: NO). In this case, the control unit 24 maintains the first passage 70 and the second passage 50 in the fully closed position, and maintains the operation mode in the mulching mode.

For example, the first predetermined condition in relation to the height of the work object (the grass 14) may be set to a height of the grass 14 that is greater than or equal to 7 cm (th1≥7 cm). The second predetermined condition in relation to the height of the work object (the grass 14) may be set to a height of the grass 14 that is less than or equal to 3 cm (th2≤3 cm). The first predetermined condition and the second predetermined condition in relation to the wetness of the grass may be determined based on an amount of water droplets (morning dew or rainwater) that is adhering to the grass 14. The first predetermined condition and the second predetermined condition in relation to the type of the grass 14 may be determined based on a color of the grass 14. Western grasses are known to be comparatively hard. In the case that the type of the grass 14 is determined to be a Western grass, it may be determined that the first predetermined condition is satisfied. Alternatively, in the case that there is a large amount of so-called weeds (grass-like vegetation that is not grass 14 per se), it may be determined that the first predetermined condition is satisfied.

Third Embodiment

Next, with reference to FIG. 12 and FIG. 13, a description will be given concerning a lawn mower 300 according to a third embodiment.

The lawn mower 300 according to the third embodiment differs from the lawn mower 10 according to the first embodiment, in that the load on the cutter blade 12 is determined based on the traveling state of the lawn mower 300. More specifically, rather than using the motor load (the motor current value), the lawn mower 300 switches between the operation modes using the traveling state of the lawn mower 300. Hereinafter, the same reference numerals are applied to the same constituent elements and the same processes that are common with those of the lawn mower 10 according to the first embodiment, and description of such features will be omitted.

FIG. 12 is a flowchart showing a process flow of a passage opening or closing amount control which is executed by the lawn mower 300 according to the third embodiment.

In step S31, the control unit 24 determines whether or not the traveling state of the lawn mower 300 is greater than or equal to the first predetermined value th1. The traveling state of the lawn mower 300 includes at least one of a turning state, an acceleration, a velocity, or a traveling mode.

For example, in the case that the amount of turning of the lawn mower 300 is large, or in the case that the lawn mower 300 is intending to decelerate and come to a stop, there is a high possibility that the grass clippings 44 that have not been sufficiently shredded may fall down onto the grass surface 14*s*, and the grass clippings 44 will remain in such a fallen down state on the grass surface 14*s*. In the case that the velocity of the lawn mower 300 is excessively high, the amount of the grass 14 that is cut by the cutter blade 12 will become large, and thus the load on the cutter blade 12 will be large. In the case that the lawn mower 300 is an autonomous working machine that is capable of traveling autonomously, and is autonomously traveling in a traveling mode in which the amount of turning thereof is large, there is a high possibility that the grass clippings 44 that have not been sufficiently shredded will remain in such a fallen down state on the grass surface 14*s*.

Thus, the lawn mower 300 according to the third embodiment, based on the traveling state of the lawn mower 300, determines the possibility that the grass clippings 44 will remain on the grass surface 14*s* after completion of the mowing operation, and the load on the cutter blade 12. The control unit 24 is capable of acquiring the traveling state of the lawn mower 300 from a traveling state acquisition unit 90. The traveling state acquisition unit 90 includes the various sensors of the sensor unit 22 shown in FIG. 5. For example, the traveling state acquisition unit 90 includes the steering angle sensor 222, the yaw rate sensor 223, the acceleration sensor 224, the wheel speed sensor 225, and the GNSS sensor 226, and the like. Further, the traveling state acquisition unit 90 may include the setting input unit 341 and the external environment recognition unit 30. The traveling state acquisition unit 90 acquires, as information indicating the traveling state of the lawn mower 300, the steering angle θ, a rate of change in the yaw rate over time, the acceleration, the velocity, the traveling mode, and the like, and outputs such information to the control unit 24.

Moreover, in the case that the lawn mower 300 is configured as a riding type of lawn mower, the traveling state acquisition unit 90 may include a non-illustrated steering sensor. In the case that the lawn mower 300 is capable of carrying out so-called pivot turning or spin turning, the traveling state acquisition unit 90 may include a non-illustrated electrical current sensor that detects the value of the electrical current supplied to the left and right traveling motors 182.

In this instance, an example will be described in which the traveling state of the lawn mower 300 is determined in accordance with the steering angle θ of the wheels 16. FIG. 13 is a schematic diagram showing an example of a turning state of the lawn mower 300.

Figure 13:
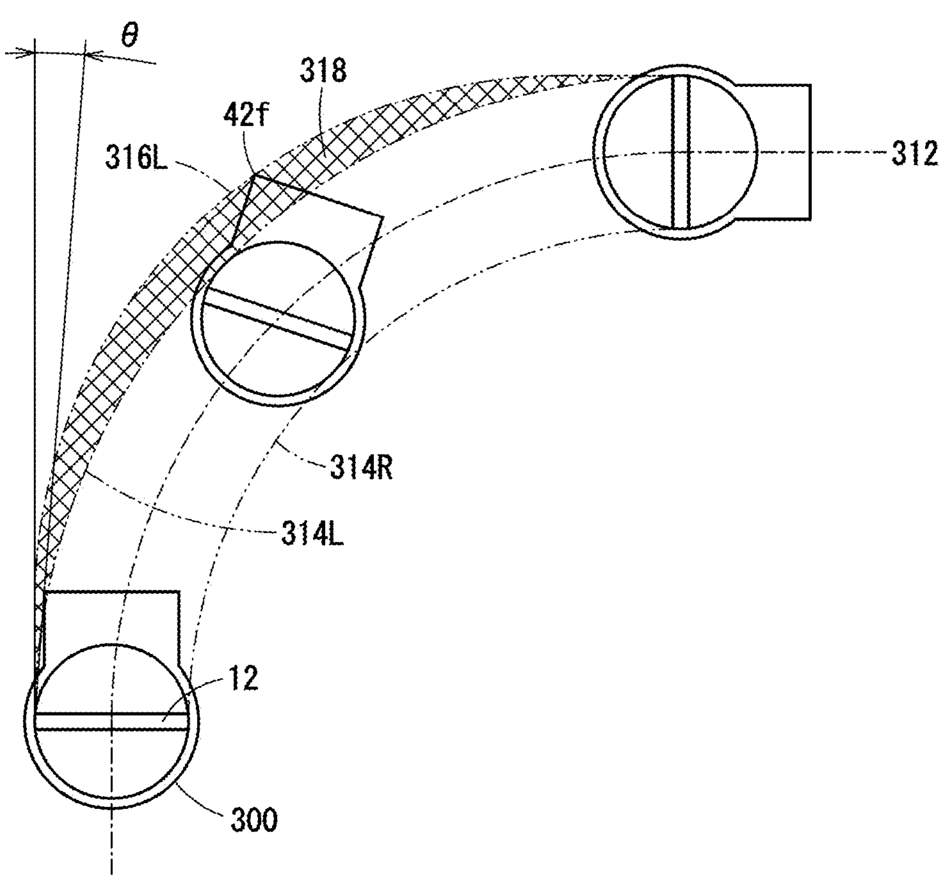
FIG. 13 is a schematic diagram showing an example of a turning state of the lawn mower.

FIG. 13 shows the lawn mower 300 that is turning in the rightward direction along a travel pathway 312. The region between a reference numeral 314R and a reference numeral 314L is a region through which the cutter blade 12 passes. A reference numeral 316L indicates a pathway of a left end of the front wall portion 42*f* of the front housing 42.

The front housing 42 passes over a region 318 (the region indicated by hatching in FIG. 13) between the reference numeral 314L and the reference numeral 316L. The grass clippings 44 fall down from the front housing 42 onto the grass surface 14*s* in the region 318. However, the cutter blade 12 does not pass over the region 318. There is a high possibility that the grass clippings 44 that have fallen down into the region 318 will not be cut again by the cutter blade 12, and will remain on the grass surface 14*s*.

Thus, in the case that the steering angle θ of the wheels 16 is greater than or equal to the first predetermined value (a first steering angle) th1, the control unit 24 determines that the traveling state of the lawn mower 300 satisfies the first predetermined condition (step S31 in FIG. 12: YES). More specifically, the control unit 24 determines that there is a high possibility that the grass clippings 44 that have not been sufficiently shredded will remain in such a fallen down state on the grass surface 14*s*.

In step S32, the control unit 24 calculates the amount of opening or closing (the degree of opening) of the first passage 70. The control unit 24, by referring for example to the graph shown in FIG. 7, is capable of calculating (acquiring) the amount of opening or closing of the first passage 70 corresponding to the traveling state of the lawn mower 300. In step S33, the control unit 24 opens at least a portion of the first passage 70, and thereby switches the operation mode to the bagging mode.

On the other hand, in the case that the steering angle θ of the wheels 16 is less than the first predetermined value th1 (step S31: NO), then in step S34, the control unit 24 determines whether or not the steering angle θ of the wheels 16 is less than or equal to the second predetermined value th2 (a second steering angle). The second predetermined value th2 may be set to the steering angle when the lawn mower 300 is in a state of traveling straight ahead, for example, in close proximity to 0 degrees.

In the case that the steering angle θ of the wheels 16 is less than or equal to the second predetermined value th2, the control unit 24 determines that the traveling state of the lawn mower 300 satisfies the second predetermined condition (step S34: YES). Since the lawn mower 300 is in the state of traveling straight ahead, the control unit 24 determines that the grass clippings 44 that have fallen down onto the grass surface 14*s* are capable of being rolled up into the interior of the blade housing 40, and can be cut again.

In step S35, the control unit 24 calculates the amount of opening or closing (the degree of opening) of the second passage 50. The control unit 24, by referring for example to the graph shown in FIG. 7, is capable of calculating (acquiring) the amount of opening or closing of the second passage 50 corresponding to the traveling state of the lawn mower 300. In step S36, the control unit 24 opens the second passage 50, and thereby switches the operation mode to the returning flow mode.

In the case that the steering angle θ of the wheels 16 is greater than the predetermined second predetermined value th2 (step S34: NO), the control unit 24 is capable of determining that the possibility that the grass clippings 44 that are not sufficiently shredded may remain on the grass surface 14*s* is not high. The control unit 24 maintains the first passage 70 and the second passage 50 in the fully closed position, and maintains the operation mode in the mulching mode.

For example, the first predetermined condition and the second predetermined condition in relation to the turning state of the lawn mower 300 may be determined based on the rate of change in the yaw rate (i.e., an acceleration in the turning direction) over time. In the case that the rate of change in the yaw rate over time in the turning direction is greater than or equal to a predetermined first rate of change in the yaw rate over time, it can be determined that the amount of turning is large. In this case, the control unit 24 may determine that the first predetermined condition is satisfied. Further, in the case that the rate of change in the yaw rate over time in the turning direction is less than the predetermined first rate of change in the yaw rate over time, the control unit 24 can determine that the amount of turning is small. In this case, the control unit 24 may determine that the second predetermined condition is satisfied.

Further, the first predetermined condition and the second predetermined condition in relation to the turning state of the lawn mower 300 may be determined based on an acceleration or a velocity of the lawn mower 300. When the acceleration of the lawn mower 300 is negative, in the case that an absolute value of the acceleration is greater than or equal to an absolute value of a predetermined first acceleration, or alternatively, in the case that the velocity of the lawn mower 300 is less than or equal to a predetermined first velocity, the control unit 24 may determine that the first predetermined condition is satisfied. This is because the lawn mower 300 is in a state in which it is intending to suddenly decelerate and come to a stop. In this case, after the grass clippings 44 have fallen down from the front housing 42, the grass clippings 44 that have fallen down will remain in place, and there is a high possibility that the grass clippings 44 that have fallen down will not be cut again by the cutter blade 12. Further, in the case that the absolute value of the acceleration of the lawn mower 300 is less than the absolute value of the predetermined first acceleration, the control unit 24 may determine that the second predetermined condition is satisfied. In this case, the lawn mower 300 is in a state in which it is either slowly decelerating, is maintaining the same velocity, or is slowly accelerating.

Furthermore, when the velocity of the lawn mower 300 is greater than or equal to a predetermined second velocity that is greater than the predetermined first velocity, the control unit 24 may determine that the first predetermined condition is satisfied. This is because, when the velocity of the lawn mower 300 is excessively high, the amount of the grass 14 that is cut by the cutter blade 12 will become large, and thus the load on the cutter blade 12 will be large. Further, in the case that the velocity of the lawn mower 300 is greater than the predetermined first velocity, and less than the predetermined second velocity, the control unit 24 is capable of determining that the velocity of the lawn mower 300 is neither excessively slow nor excessively fast. In this case, the control unit 24 may determine that the second predetermined condition is satisfied.

Further still, in the case that the lawn mower 300 is a known type of autonomous working machine, the first predetermined condition and the second predetermined condition in relation to the turning state of the lawn mower 300 may be determined based on the traveling mode of the lawn mower 300. In the case that the lawn mower 300 is traveling in a traveling mode in which the amount of turning thereof is large, the control unit 24 may determine that the first predetermined condition is satisfied. In this case, the lawn mower 300, for example, may be an autonomous working machine that operates inside of an area defined by an area wire. Alternatively, the lawn mower 300 may be an autonomous working machine that generates a local map by means of Simultaneous Localization and Mapping (SLAM) technology in which various sensors such as the LiDAR device 302 or the like are used, and which is capable of recognizing its own position.

Figures 14A, 14B:
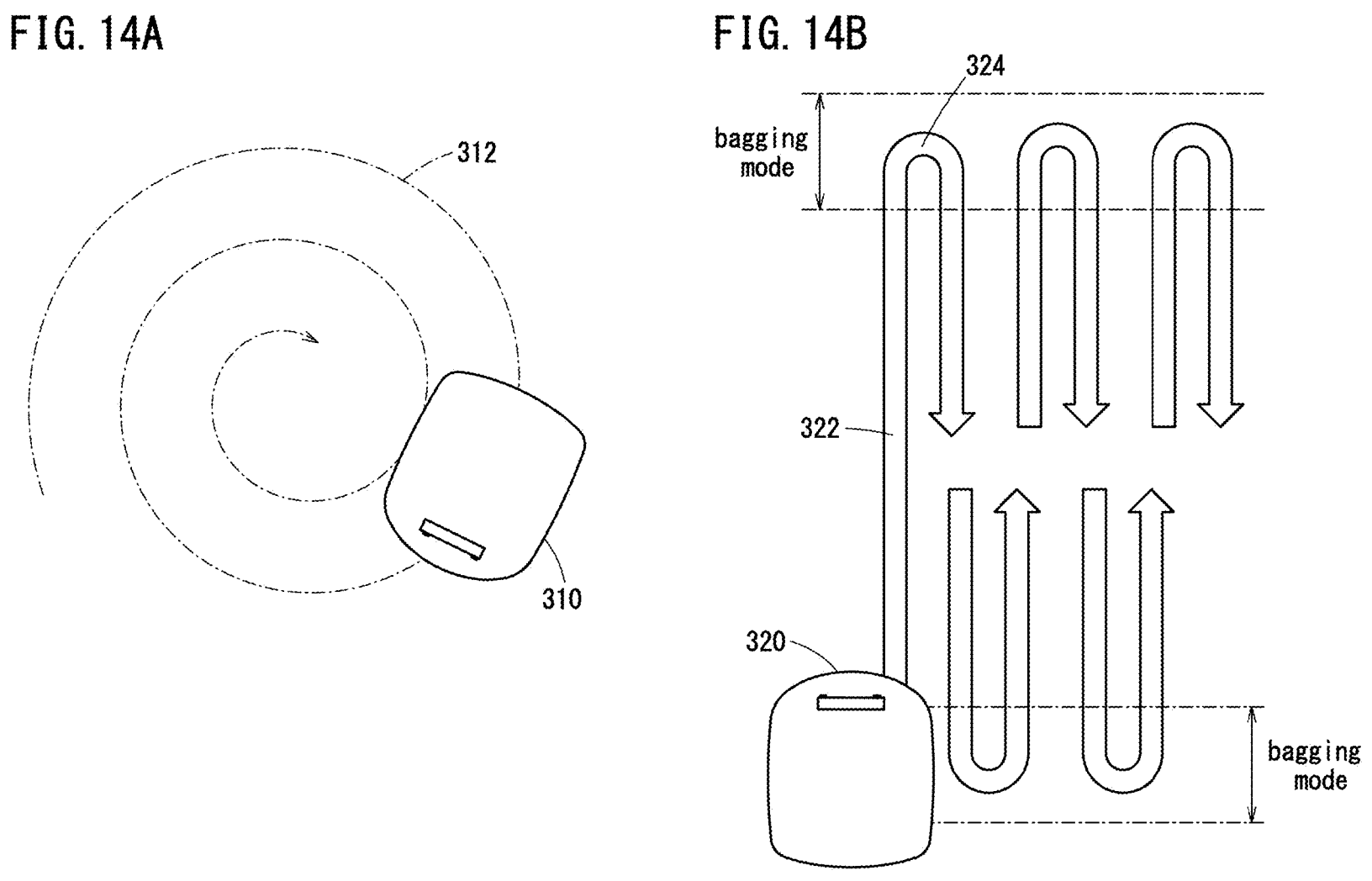

FIG. 14A is a schematic diagram showing an example of a pathway 312 along which a lawn mower 310 serving as an autonomous working machine travels autonomously. In FIG. 14A, the traveling mode of the lawn mower 310 is set to a “spiral mode” in which the lawn mower 310 travels in a spiral shape. Since the lawn mower 310 travels in such a spiral shape, the amount of turning of the lawn mower 310 is large. In this manner, in the case that the traveling mode is set to the spiral mode, the control unit 24 may determine that the first predetermined condition is satisfied.

FIG. 14B is a schematic diagram showing an example of a pathway (322, 324) along which a lawn mower 320 travels autonomously. In FIG. 14B, the traveling mode of the lawn mower 320 is set to a “parallel mode” in which directly forward traveling and U-turn traveling are alternately repeated. In the case that the lawn mower 320 makes a U-turn along the pathway 324, the amount of turning of the lawn mower 320 is large. In this manner, in the case that the traveling mode is set to the parallel mode and the lawn mower 320 is making a U-turn, the control unit 24 may determine that the first predetermined condition is satisfied.

Fourth Embodiment

Next, with reference to FIG. 15 and FIG. 16, a description will be given concerning a lawn mower 400 according to a fourth embodiment.

The lawn mower 400 according to the fourth embodiment is a known type of autonomous working machine.

The lawn mower 400 according to the fourth embodiment differs from the lawn mower 10 according to the first embodiment, in that the map 410 is included in which operation modes are set for respective small regions (operation areas) within an area, and the operation modes are switched in accordance with the map 410. Hereinafter, the same reference numerals are applied to the same constituent elements and the same processes that are common with those of the lawn mower 10 according to the first embodiment, and description of such features will be omitted.

Figure 15:
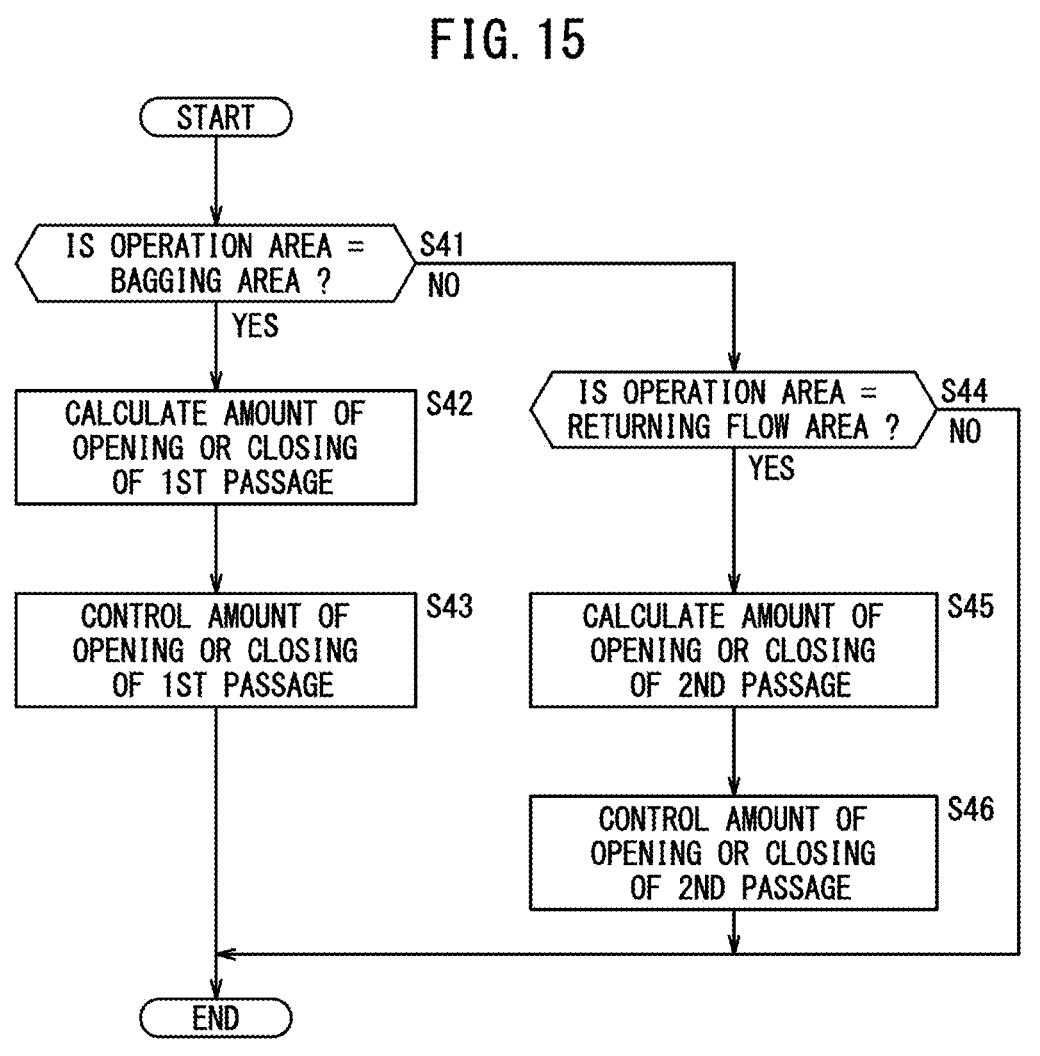

FIG. 15 is a flowchart showing a process flow of a passage opening or closing amount control which is executed by the lawn mower 400 according to the fourth embodiment.

In step S41, based on the map 410 that was previously stored in the memory, the control unit 24 determines whether or not the current operation area of the lawn mower 400 is a bagging area.

Figure 16:
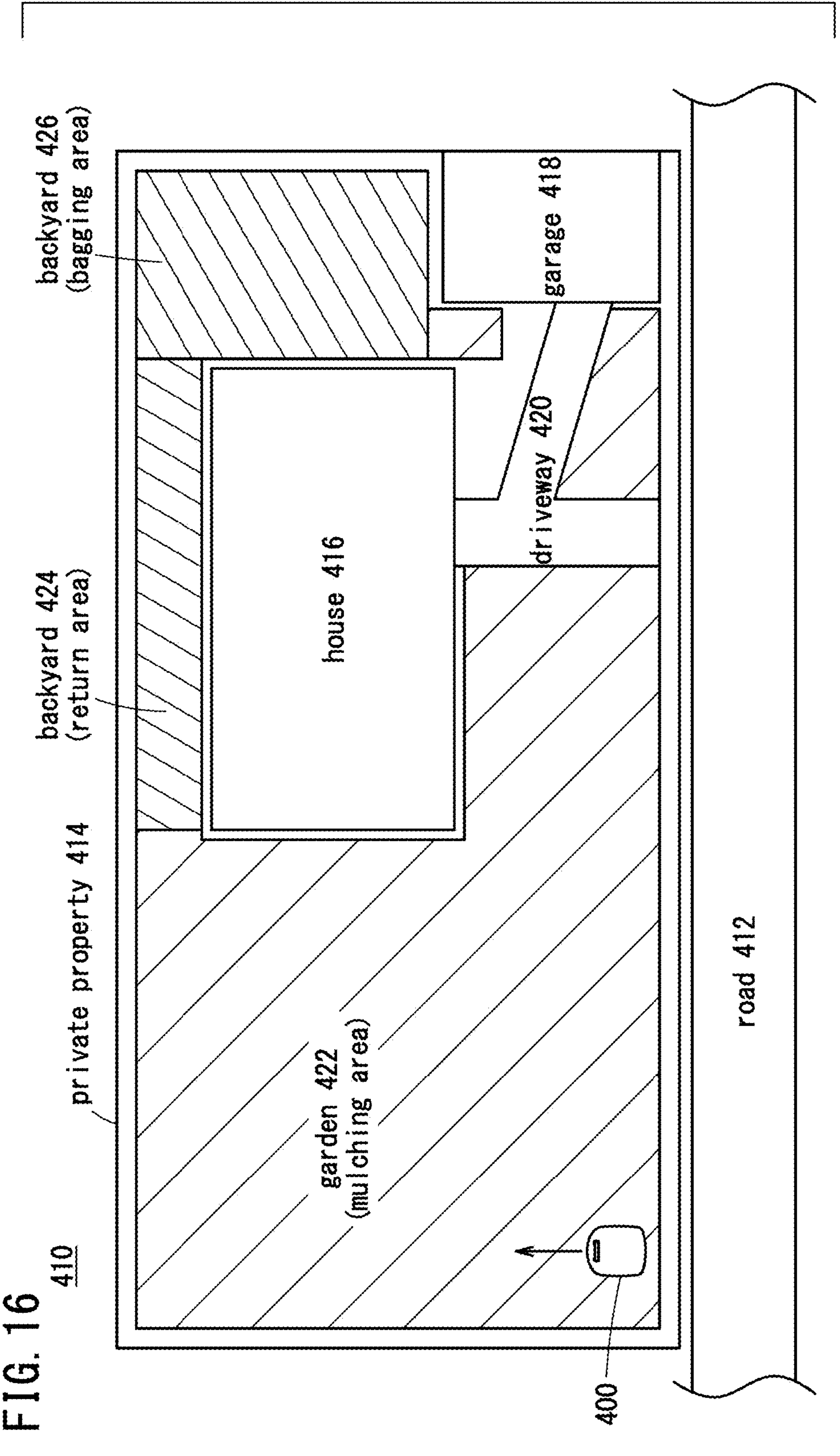
FIG. 16 is a schematic diagram showing an example of a map in which an operation mode is set for each of operation areas.

FIG. 16 is a schematic diagram showing an example of the map 410 in which an operation mode is set for each of the operation areas. In this instance, an example is described in which the operation mode is switched based on the map 410. In the map 410, a public road 412 and private property 414 are shown. The private property 414 includes a house 416, a garage 418, a paved private road (a so-called driveway connecting the public road 412 with the house 416 and the like) 420, a garden 422, a backyard 424, and a backyard 426.

In the map 410, the garden 422, the backyard 424, and the backyard 426 are operation areas in which the mowing operation is performed by the lawn mower 400.

Since the workload in the garden 422 is neither high nor low, the mulching mode is set for the garden 422 (a mulching area, a third area). The backyard 424 is an area where the exposure to sun is poor, and where the grass 14 does not grow well, and thus the workload in the backyard 424 is low. The returning flow mode is set for the backyard 424 (a returning flow (return) area, a second area). The backyard 426, for example, is an area where the density of the grass 14 is high, and where the grass 14 grows quickly, and thus is an area where it is undesirable for the grass clippings 44 to be dropped. The bagging mode is set for the backyard 426 (a bagging area, a first area).

In the case that the lawn mower 400 (the lawn mower itself) is positioned in the backyard 426, the control unit 24 determines that the current operation area is the bagging area (the first area), and that the first predetermined condition is satisfied (step S41 of FIG. 15: YES).

In step S42, the control unit 24 calculates the amount of opening or closing (the degree of opening) of the first passage 70. The control unit 24, by referring for example to the graph shown in FIG. 8, is capable of calculating (acquiring) the amount of opening or closing of the first passage 70 corresponding to the bagging area. In step S43, the control unit 24 opens at least a portion of the first passage 70, and thereby switches the operation mode to the bagging mode.

On the other hand, in the case that the current operation area is not the bagging area (the first area) (step S41: NO), then in step S44, the control unit 24 determines whether or not the current operation area is the returning flow area (the second area).

In the case that the lawn mower 400 (the lawn mower itself) is positioned in the backyard 424, the current operation area is the returning flow area (the second area), and the control unit 24 determines that the second predetermined condition is satisfied (step S44: YES). In step S45, the control unit 24 calculates the amount of opening or closing (the degree of opening) of the second passage 50. The control unit 24, by referring for example to the graph shown in FIG. 8, is capable of calculating (acquiring) the amount of opening or closing of the second passage 50 corresponding to the returning flow mode. In step S46, the control unit 24 opens the second passage 50, and thereby switches the operation mode to the returning flow mode.

In the case that the current operation area is not the returning flow area (the second area), the control unit 24 is capable of determining that the current operation area is the mulching area (the third area) (step S44: NO). In this case, the control unit 24 maintains the first passage 70 and the second passage 50 in the fully closed position, and maintains the operation mode in the mulching mode.

Moreover, it should be noted that the map 410 may be created manually by the user, or may be generated automatically by the control unit 24.

For example, the user may visually confirm the work object from a point of view in relation to the workload, such as the situation in which the grass 14 is growing, the wetness of the grass 14, and the type of the grass 14, and via the setting input unit 341, may manually allocate the operation mode for each of the operation areas. In the case that the lawn mower 400 is configured as a riding lawnmower, the user may perform a test run within the areas, may collect data (for example, the motor current value) in relation to the workload, and may implement the division of the operation areas based on such data.

Further, the control unit 24 may link the data in relation to the workload that was collected by the user with GNSS information and a past work history, and may thereby automatically implement the division of the operation areas. The control unit 24 may cause the lawn mower 400 to travel autonomously, and may link the GNSS information with information in relation to the workload of the cutter blade 12 and the state of the grass 14 (for example, the motor current value and the image data captured by the camera 301), and may thereby automatically generate the map 410.

For example, the control unit 24 may consider the map 410 as being a grid map of one square meter, and may automatically allocate any one of the bagging mode, the mulching mode, and the returning flow mode to each of the grids. Alternatively, the control unit 24 may set a number of passes that the lawn mower 400 is allowed to pass through each of the operation areas, and in the case that a predetermined number of passes has been reached, may be set in a manner so as to switch to the returning flow mode or the mulching mode.

In the returning flow mode and the mulching mode, although the grass clippings 44 that are cut by the lawn mower 400 are preferably discharged from downwardly of the lawn mower 400 and onto the lawn surface 14*s*, the method in which the grass clippings 44 are discharged is not a critical feature. For example, the method in which the grass clippings 44 are discharged may be a rear discharge method, in which the grass clippings 44 are discharged from a rearward side of the lawn mower 400 onto the lawn surface 14*s*. Alternatively, the method in which the grass clippings 44 are discharged may be a side discharge method, in which the grass clippings 44 are discharged from lateral sides of the lawn mower 400 onto the lawn surface 14*s*.

The following supplementary notes are further disclosed in relation to the above-described embodiment.

Supplementary Note 1

The lawn mower (10, 100, 200, 300, 310, 320, 400) according to the present invention includes the operation unit (12) configured to cut the work object (14) by rotating, and configured to generate the transporting air (A1, A2, A3, A4, A5), the drive source (18) configured to drive the operation unit, the control unit (24) configured to control the drive source, the housing (26) including the blade housing (40) in which the operation unit is accommodated, and the front housing (42) configured to project out in the frontward direction from the blade housing, and to communicate with the blade housing, the accommodation container (28) provided for the front housing, the first passage (70) configured to place the front housing and the accommodation container in communication, and the flow path adjustment unit (72, 92) disposed between the operation unit and the accommodation container, and provided at the position where the transporting air (A4) that flows through the first passage is adjustable, wherein the control unit includes at least one processor configured to execute the computer-executable instruction that is stored in a memory, and by the computer-executable instruction being executed by the at least one processor, in accordance with the predetermined condition in relation to the load of the operation unit, controls the degree of opening of the flow path adjustment unit (step S13, step S23, step S33, step S43).

In accordance with such a configuration, the lawn mower is capable of accommodating the grass clippings in the accommodation container in accordance with the load on the operation unit, and after the grass clippings are sufficiently shredded, the grass clippings can be discharged onto the lawn surface. Consequently, the quality of the work, such as the appearance or the like of the lawn after the lawn mowing operation, can be improved. Specifically, a lawn mower is provided that provides a good finish after the lawn mowing operation.

Supplementary Note 2

In the lawn mower according to Supplementary Note 1, there may further be provided the electrical current sensor (221) configured to detect the electrical current value supplied to the drive source, wherein, in the case that the electrical current value is greater than or equal to the first predetermined value, the control unit may determine that the first predetermined condition is satisfied (step S11: YES), and in the case that the electrical current value satisfies the first predetermined condition, the control unit may increase the degree of opening of the flow path adjustment unit (step S13).

In accordance with such a configuration, in accordance with the value of the electrical current supplied to the drive source, the lawn mower can transport the grass clippings that are not sufficiently shredded to the accommodation container. Clumps of the grass clippings and large pieces of the grass clippings are prevented from falling down onto the grass surface, and the appearance of the grass surface is prevented from becoming worsened after the operation.

Supplementary Note 3

In the lawn mower according to Supplementary Note 2, the second passage (50) is provided in the blade housing, and configured to place the blade housing and the accommodation container in communication, and in the case that the electrical current value satisfies the second predetermined condition, the control unit may open the second passage (step S16).

In accordance with such a configuration, the grass clippings accommodated in the accommodation container are capable of being delivered back into the blade housing, and can be shredded again by the cutter blade. In accordance with this feature, the capacity of the accommodation container is prevented from becoming full. The length of the operation time period of the lawn mowing operation can be secured.

Supplementary Note 4

In the lawn mower according to Supplementary Note 3, in the case that the electrical current value is less than or equal to the second predetermined value which is less than the first predetermined value, the control unit may determine that the second predetermined condition is satisfied (step S14: YES).

In accordance with such a configuration, only in the case that the load on the operation unit is particularly light, the grass clippings can be returned from the accommodation container into the blade housing. In accordance with this feature, the amount of the grass clippings discharged from downwardly of the housing can be made equal between the mulching mode and the returning flow mode.

Supplementary Note 5

In the lawn mower according to Supplementary Note 1, there may further be provided the external environment recognition unit (30) configured to recognize the state of the work object, wherein, in the case that the state of the work object satisfies the first predetermined condition, the control unit may increase the degree of opening of the flow path adjustment unit (step S23).

In accordance with such a configuration, in accordance with the state of the work object, the lawn mower can transport the grass clippings that are not sufficiently shredded to the accommodation container. Clumps of the grass clippings and large pieces of the grass clippings are prevented from falling down onto the grass surface, and the appearance of the grass surface is prevented from becoming worsened after the operation.

Supplementary Note 6

In the lawn mower according to Supplementary Note 5, the first predetermined condition may be a condition related to at least one from among the height of the work object, the density of the work object, the type of the work object, or the state of wetness of the work object.

Supplementary Note 7

In the lawn mower according to Supplementary Note 6, the second passage (50) may be provided in the blade housing, and configured to place the blade housing and the accommodation container in communication, and in the case that the state of the work object satisfies the second predetermined condition, the control unit may open the second passage (step S26).

In accordance with such a configuration, the grass clippings accommodated in the accommodation container are capable of being delivered back into the blade housing, and can be shredded again by the cutter blade. In accordance with this feature, the capacity of the accommodation container is prevented from becoming full. The length of the operation time period of the lawn mowing operation can be secured.

Supplementary Note 8

In the lawn mower according to Supplementary Note 7, in the case that the state of the work object is less than or equal to the second predetermined value which is lower than the first predetermined value that is the threshold value of the first predetermined condition, the control unit may determine that the second predetermined condition is satisfied (step S24).

In accordance with such a configuration, only in the case that the load on the operation unit is particularly light, the grass clippings can be returned from the accommodation container into the blade housing. In accordance with this feature, the amount of the grass clippings discharged from downwardly of the housing can be made equal between the mulching mode and the returning flow mode.

Supplementary Note 9

In the lawn mower according to Supplementary Note 1, there may further be provided the traveling state acquisition unit (90) configured to acquire the traveling state of the lawn mower itself, wherein, in the case that the traveling state satisfies the first predetermined condition, the control unit may increase the degree of opening of the flow path adjustment unit (step S33).

In accordance with such a configuration, in accordance with the traveling state of the lawn mower itself, the lawn mower can transport the grass clippings that are not sufficiently shredded to the accommodation container. Clumps of the grass clippings and large pieces of the grass clippings are prevented from falling down onto the grass surface, and the appearance of the grass surface is prevented from becoming worsened after the operation.

Supplementary Note 10

In the lawn mower according to Supplementary Note 9, the first predetermined condition may be a condition related to at least one from among the turning state of the lawn mower itself, the acceleration of the lawn mower itself, the velocity of the lawn mower itself, or the traveling mode of the lawn mower itself.

Supplementary Note 11

In the lawn mower according to Supplementary Note 10, the first predetermined condition may be at least one from among that the steering angle is greater than or equal to the predetermined first steering angle, that the rate of change in the yaw rate over time is greater than or equal to the predetermined first rate of change in the yaw rate over time, that the absolute value of the acceleration, when the acceleration is negative, is greater than or equal to the absolute value of the predetermined first acceleration, that the velocity is less than or equal to the predetermined first velocity, that the velocity is greater than or equal to the predetermined second velocity that is greater than the first velocity, or that the traveling mode is set to the spiral mode.

Supplementary Note 12

In the lawn mower according to Supplementary Note 11, the second passage may be provided in the blade housing, and configured to place the blade housing and the accommodation container in communication, and in the case that the traveling state satisfies the second predetermined condition, the control unit may open the second passage (step S36).

In accordance with such a configuration, the grass clippings accommodated in the accommodation container are capable of being delivered back into the blade housing, and can be shredded again by the cutter blade. In accordance with this feature, the capacity of the accommodation container is prevented from becoming full. The length of the operation time period of the lawn mowing operation can be secured.

Supplementary Note 13

In the lawn mower according to Supplementary Note 12, the second predetermined condition may be at least one from among that the steering angle is less than the predetermined first steering angle, that the rate of change in the yaw rate over time is less than the predetermined first rate of change in the yaw rate over time, that the absolute value of the acceleration is less than the absolute value of the predetermined first acceleration, or that the velocity is greater than the first velocity and is less than the second velocity.

Supplementary Note 14

In the lawn mower according to Supplementary Note 1, the lawn mower may be the autonomous working machine (310, 320) configured to perform work autonomously, the control unit may include the map (410) that is divided into the small regions, and the operation mode may be set to each of the small regions, and in the case that the lawn mower itself enters into the predetermined first area, the control unit may increase the degree of opening of the flow path adjustment unit (step S43).

In accordance with such a configuration, in accordance with the map, the lawn mower can transport the grass clippings that are not sufficiently shredded to the accommodation container. Clumps of the grass clippings and large pieces of the grass clippings are prevented from falling down onto the grass surface, and the appearance of the grass surface is prevented from becoming worsened after the operation.

Supplementary Note 15

In the lawn mower according to Supplementary Note 14, the second passage (50) may be provided in the blade housing, and configured to place the blade housing and the accommodation container in communication, and in the case that the lawn mower itself enters into the predetermined second area, the control unit may open the second passage (step S46).

In accordance with such a configuration, the grass clippings accommodated in the accommodation container are capable of being delivered back into the blade housing, and can be shredded again by the cutter blade. In accordance with this feature, the capacity of the accommodation container is prevented from becoming full. The length of the operation time period of the lawn mowing operation can be secured.

Supplementary Note 16

In the lawn mower according to Supplementary Note 15, the map may include the predetermined first area to which the bagging mode is allocated, the work object being delivered from the front housing to the accommodation container in the bagging mode, the predetermined second area to which the returning flow mode is allocated, the work object being returned from the accommodation container into the blade housing in the returning flow mode, and the third area to which the mulching mode is allocated, the work object being discharged downwardly of the housing in the mulching mode.

Although a description has been given in detail concerning the present disclosure, it is not intended that the present disclosure be limited to each of the embodiments described above. Within a range that does not depart from the essence and gist of the present disclosure, or within a range that does not depart from the content described in the claims and their equivalents, various additions, substitutions, changes, partial deletions, or the like can be made to such embodiments.

Further, such embodiments can also be implemented together in combination. For example, the control unit 24 may switch the operation mode in accordance with a combined condition in which a condition related to the motor load (the motor current value) and a condition related to the traveling state of the lawn mower 10 are combined. Alternatively, the control unit 24 may switch the operation mode in accordance with a combined condition in which a condition related to the motor load (the motor current value) and a condition related to the external environment recognition information (image information of the camera 301 or the like) are combined. Furthermore, the control unit 24 may switch the operation mode in accordance with a combined condition in which a condition related to the external environment recognition information (image information of the camera 301 or the like) and a condition related to the traveling state of the lawn mower 10 are combined.

Further, in the embodiments described above, the order of each of the operations and the order of each of the processes are shown as examples, and the present invention is not limited to such operations and processes. The same applies to cases in which numerical values or mathematical expressions are used in the description of the aforementioned embodiments.

The invention claimed is:

1. A lawn mower, comprising:

an operation unit configured to cut a work object by rotating, and configured to generate transporting air;

a drive source configured to drive the operation unit;

a control unit configured to control the drive source;

a housing including a blade housing in which the operation unit is accommodated, and a front housing configured to project out in a frontward direction from the blade housing, and to communicate with the blade housing;

an accommodation container provided for the front housing;

a first passage configured to place the front housing and the accommodation container in communication; and a flow path adjustment unit disposed between the operation unit and the accommodation container, and provided at a position where the transporting air that flows through the first passage is adjustable;

wherein the control unit comprises at least one processor configured to execute a computer-executable instruction that is stored in a memory, and by the computer-executable instruction being executed by the at least one processor, in accordance with a predetermined condition in relation to a load of the operation unit, controls a degree of opening of the flow path adjustment unit.

2. The lawn mower according to claim 1, further comprising an electrical current sensor configured to detect an electrical current value supplied to the drive source, wherein:

in a case that the electrical current value is greater than or equal to a first predetermined value, the control unit determines that a first predetermined condition is satisfied; and in a case that the electrical current value satisfies the first predetermined condition, the control unit increases the degree of opening of the flow path adjustment unit.

3. The lawn mower according to claim 2, wherein:

a second passage is provided in the blade housing, and configured to place the blade housing and the accommodation container in communication; and in a case that the electrical current value satisfies a second predetermined condition, the control unit opens the second passage.

4. The lawn mower according to claim 3, wherein, in a case that the electrical current value is less than or equal to a second predetermined value which is less than the first predetermined value, the control unit determines that the second predetermined condition is satisfied.

5. The lawn mower according to claim 1, further comprising an external environment recognition unit configured to recognize a state of the work object, wherein, in a case that the state of the work object satisfies a first predetermined condition, the control unit increases the degree of opening of the flow path adjustment unit.

6. The lawn mower according to claim 5, wherein the first predetermined condition is a condition related to at least one from among a height of the work object, a density of the work object, a type of the work object, or a state of wetness of the work object.

7. The lawn mower according to claim 6, wherein:

a second passage is provided in the blade housing, and configured to place the blade housing and the accommodation container in communication; and in a case that the state of the work object satisfies a second predetermined condition, the control unit opens the second passage.

8. The lawn mower according to claim 7, wherein, in a case that the state of the work object is less than or equal to a second predetermined value which is lower than a first predetermined value that is a threshold value of the first predetermined condition, the control unit determines that the second predetermined condition is satisfied.

9. The lawn mower according to claim 1, further comprising a traveling state acquisition unit configured to acquire a traveling state of the lawn mower itself, wherein, in a case that the traveling state satisfies a first predetermined condition, the control unit increases the degree of opening of the flow path adjustment unit.

10. The lawn mower according to claim 9, wherein the first predetermined condition is a condition related to at least one from among a turning state of the lawn mower itself, an acceleration of the lawn mower itself, a velocity of the lawn mower itself, or a traveling mode of the lawn mower itself.

11. The lawn mower according to claim 10, wherein the first predetermined condition is at least one from among:

that a steering angle is greater than or equal to a predetermined first steering angle;

that a rate of change in a yaw rate over time is greater than or equal to a predetermined first rate of change in the yaw rate over time;

that an absolute value of the acceleration, when the acceleration is negative, is greater than or equal to an absolute value of a predetermined first acceleration;

that the velocity is less than or equal to a predetermined first velocity;

that the velocity is greater than or equal to a predetermined second velocity that is greater than the first velocity; or that the traveling mode is set to a spiral mode.

12. The lawn mower according to claim 11, wherein:

a second passage is provided in the blade housing, and configured to place the blade housing and the accommodation container in communication; and in a case that the traveling state satisfies a second predetermined condition, the control unit opens the second passage.

13. The lawn mower according to claim 12, wherein the second predetermined condition is at least one from among:

that the steering angle is less than the predetermined first steering angle;

that the rate of change in the yaw rate over time is less than the predetermined first rate of change in the yaw rate over time;

that the absolute value of the acceleration is less than the absolute value of the predetermined first acceleration; or that the velocity is greater than the first velocity and is less than the second velocity.

14. The lawn mower according to claim 1, wherein:

the lawn mower is an autonomous working machine configured to perform work autonomously;

the control unit includes a map that is divided into small regions, and an operation mode is set to each of the small regions; and in a case that the lawn mower itself enters into a predetermined first area, the control unit increases the degree of opening of the flow path adjustment unit.

15. The lawn mower according to claim 14, wherein:

a second passage is provided in the blade housing, and configured to place the blade housing and the accommodation container in communication; and in a case that the lawn mower itself enters into a predetermined second area, the control unit opens the second passage.

16. The lawn mower according to claim 15, wherein:

the map includes:

the predetermined first area to which a bagging mode is allocated, the work object being delivered from the front housing to the accommodation container in the bagging mode;

the predetermined second area to which a returning flow mode is allocated, the work object being returned from the accommodation container into the blade housing in the returning flow mode; and a third area to which a mulching mode is allocated, the work object being discharged downwardly of the housing in the mulching mode.

* * * * *